United States Patent [19]

Park

[11] Patent Number: 4,714,716

[45] Date of Patent: Dec. 22, 1987

[54] LIGHTLY CROSSLINKED LINEAR OLEFINIC POLYMER FOAMS AND PROCESS FOR MAKING

[75] Inventor: Chung P. Park, Pickerington, Ohio

[73] Assignee: The Dow Chemical Company, Midland, Mich.

[21] Appl. No.: 672,001

[22] Filed: Nov. 16, 1984

[51] Int. Cl.$^4$ .............................................. C08J 9/14
[52] U.S. Cl. ........................................ 521/80; 264/53; 521/79; 521/81; 521/82; 521/86
[58] Field of Search .................. 521/96, 146, 143, 79, 521/81, 80; 264/53

[56] References Cited

U.S. PATENT DOCUMENTS

| | | |
|---|---|---|
| 3,250,730 | 5/1966 | Palmer . |
| 3,452,123 | 6/1969 | Beckmann et al. . |
| 4,102,829 | 7/1978 | Watanabe et al. . |
| 4,160,072 | 7/1979 | Shinkai et al. ........................ 521/97 |
| 4,226,946 | 10/1980 | Park et al. . |
| 4,246,211 | 1/1981 | Kuhnel et al. ........................ 521/81 |
| 4,252,906 | 2/1981 | Hosokawa et al. . |
| 4,266,041 | 5/1981 | Kuhnel et al. ........................ 521/144 |
| 4,289,857 | 9/1981 | Hoki et al. ........................ 521/85 |
| 4,333,898 | 6/1982 | Schmidtchen ........................ 521/82 |
| 4,351,910 | 9/1982 | Sugitani et al. . |
| 4,413,066 | 11/1983 | Isaka et al. ........................ 521/149 |
| 4,421,867 | 12/1983 | Nojiri et al. . |
| 4,446,254 | 5/1984 | Nakae et al. . |
| 4,454,086 | 6/1984 | Corbett et al. . |
| 4,456,704 | 6/1984 | Fukumura et al. ........................ 521/82 |

FOREIGN PATENT DOCUMENTS 58-1530 1/1983 Japan .
1408154 10/1975 United Kingdom .

OTHER PUBLICATIONS

Development Data Sheet, Hercules Coupling Agent 53076, Bulletin OPD-24D, 6 pp.

*Primary Examiner*—Morton Foelak

[57] ABSTRACT

A substantially closed-celled linear polyolefin foam is made by melt processing under pressure a linear polyolefin together with a volatile blowing agent and a crosslinking agent and then expanding the polymer. Suitable crosslinking agents, including azido and vinyl functional silanes, organic peroxides, multifunctional vinyl monomers, and oxygen, increase the melt tension and melt viscosity of the polymer by lightly crosslinking the polymer with itself to enable the production of foams having improved properties in comparison with branched polyolefin foams.

12 Claims, 7 Drawing Figures

LIGHTLY CROSSLINKED LINEAR OLEFINIC POLYMER FOAMS AND PROCESS FOR MAKING

BACKGROUND OF THE INVENTION

This invention relates to lightly crosslinked linear olefinic polymer foam materials and processes for the preparation thereof.

Closed-cell branched ethylenic polymer foams may be manufactured by the process of extrusion foaming, wherein a normally solid thermoplastic ethylenic polymer resin, such as low density polyethylene, is melt processed and mixed under pressure with a volatile blowing agent to form a flowable gel. The gel is then passed through a shaping orifice or die opening into a zone of lower pressure. As the pressure is lowered, the volatile constituent of the gel vaporizes forming cells in the resin structure, which cools to a cellular foam material.

Linear olefinic polymers such as linear low density polyethylene, high density polyethylene, and polypropylene have several properties which make the use of these polymers in foams desirable. For example, these linear olefinic polymers have a higher modulus of elasticity, greater toughness, higher heat distortion temperature, and lower permeability to blowing agents than other branched olefins. However, previous attempts to produce low density foams of these linear olefins by an extrusion process have been unsuccessful. Linear polyolefins, when foamed by an extrusion process suffer from small foam cross section, high levels of open cells, flow instability, and a narrow range of foaming temperatures.

The exact cause of problems of foaming linear polyolefins is not believed to be known. However, it is generally believed that poor melt strength together with a sharp change in melt viscosity near the transition temperature makes extrusion foaming of linear polyolefins difficult. With these properties, it is difficult to control bubble expansion during extrusion and under conditions of heat and high shear stresses. This results in many broken bubbles (open cells) during expansion and consequent poor foams.

Previous efforts to cure these problems with the foamability of linear polyolefins have centered around blending a linear polyolefin with another olefin polymer having good extrusion foamability. For example, Park et al, U.S. Pat. No. 4,226,946, blended a linear polyethylene with a low density branched polyethylene to improve extrusion foamability of the linear polyethylene. Watanabe et al, U.S. Pat. No. 4,102,829, blended an ionomer resin with a linear polyethylene for the same purpose. However, such known methods offer only partial solutions because of one or more deficiencies in the range of operating parameters, cost of materials, and final foam properties.

It is also known that relatively lightly to moderately crosslinked thermoplastic polymers have melt properties that are suitable for foam expansion. However, such crosslinked polymers are difficult to process on conventional melt processing apparatus such as extruders because of flow instability. The prior art has generally not utilized crosslinked polymers on such apparatus because shear degradation of the polymer occurs during melt processing and extrusion.

Accordingly, there is a need in the art for linear olefinic polymer compositions and processes which can be utilized to foam or expand such polymers in conventional melt processing apparatus.

SUMMARY OF THE INVENTION

The present invention meets that need by providing a process for the preparation of a lightly crosslinked linear olefinic polymer foam having a substantially closed-cell structure. The term "linear olefinic polymer" as used in this specification includes both polymers and copolymers of linear olefins such as linear low density polyethylene, high density polyethylene and polypropylene, as well as polystyrene.

A linear olefinic polymer or blend of linear olefinic polymers is melt processed in a conventional manner by feeding, melting, and metering it in a conventional melt processing apparatus such as an extruder. A volatile blowing agent and a crosslinking agent are mixed with the linear olefinic polymer under pressure to form a flowable gel or admixture. The crosslinking agent is added in an amount which is sufficient to initiate crosslinking and raise the pressure of the gel or admixture at the die opening to approximately 400 psig or above but insufficient to cause melt fracture of the polymer to occur. "Melt fracture" is a term used in the art to describe a melt flow instability of a polymer as it is extruded through a die which flow instability causes voids and/or other irregularities in the final product. Suitable crosslinking agents have been found to include azido and vinyl functional silanes, organic peroxides, multifunctional vinyl monomers, and oxygen.

As the flowable gel or admixture is extruded through the die opening to a zone of lower pressure, the volatile blowing agent activates to expand the linear olefinic polymer to a substantially closed-cell foam structure which is lightly crosslinked to itself. Foams having densities of between 0.6 and 15 pounds per cubic foot (pcf) may be produced. The linear olefinic polymer foams have excellent dimensional stability and higher compressive strengths and heat distortion temperatures than branched low density polyethylene foams of the same density.

The linear olefinic polymer foams of the present invention may be produced using conventional melt processing equipment and conventional processes such as extrusion and injection molding. The compositions are useful as structural foams, crosslinked jackets for cables and wires, thermocollapse resistant films, and crosslinked polyolefin sheet for polyolefin foam production.

Accordingly, it is an object of the present invention to provide linear olefinic polymer compositions and processes which can be utilized to expand such compositions to substantially closed-cell foams. This and other objects and advantages of the present invention will become apparent from the following detailed description, the accompanying drawings, and the appended claims.

DETAILED DESCRIPTION OF THE PREFERRED EMBODIMENTS

Figure 1:
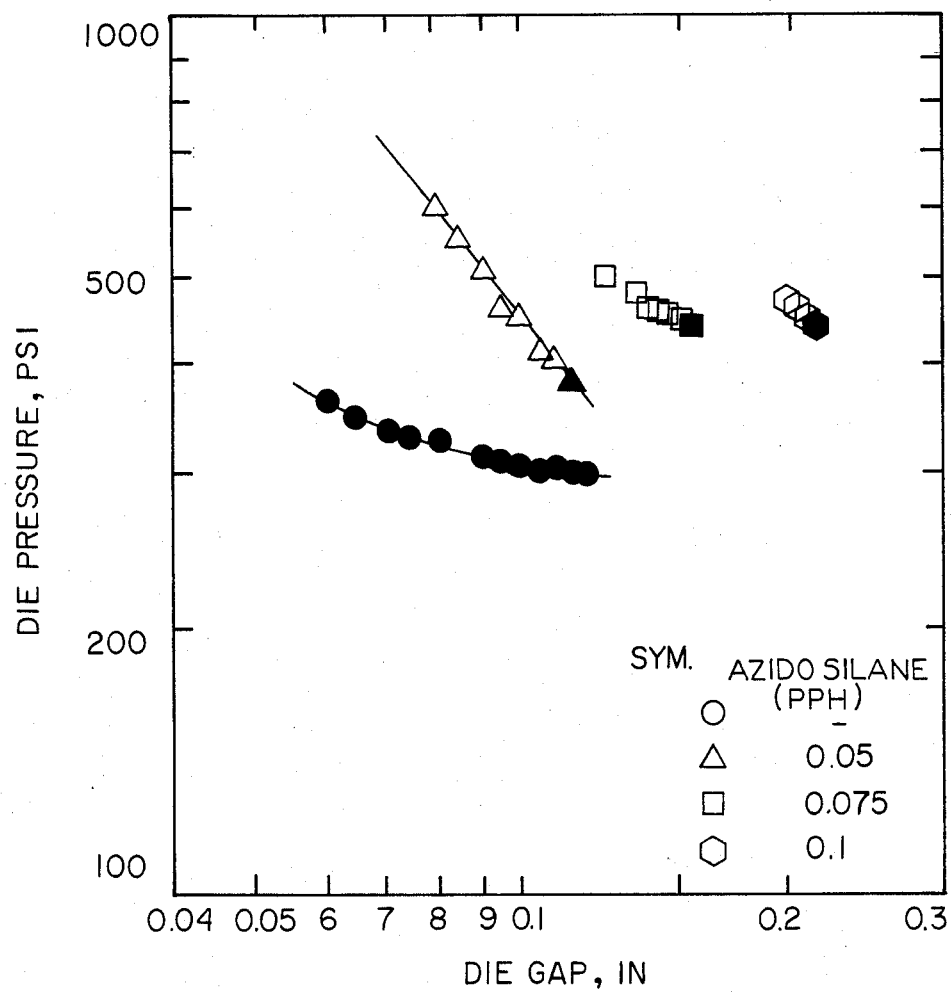
FIG. 1 is a graph of die pressure versus die gap for a linear low density polyethylene (having a melt index of 1.0 and a density of 0.935 gm/cc) foam crosslinked with an azido silane and using FC-12 as a blowing agent; open and filled symbols indicate good and poor foams, respectively.

The process of the present invention permits the production of a low density foam material having a substantially closed-cell structure from a linear olefinic polymer or blend of linear olefinic polymers by an extrusion process. Examples of linear olefinic polymers which can be used include linear low density polyethylene, high density polyethylene, polypropylene, polystyrene, and blends thereof. Copolymers of linear olefins may also be utilized. Such linear olefinic polymers have been, heretofore, difficult to expand by conventional melt processing apparatuses into suitable foamed materials.

Blowing agents useful in the practice of the present invention are well known and may comprise solids which decompose into gaseous products at extrusion temperatures or volatile liquids. A preferred class of blowing agents is the group of halogenated hydrocarbon compounds having from 1 to 4 carbon atoms. Dichlorodifluoromethane (FC-12) is most preferred as it is inexpensive and readily available. When halogenated hydrocarbon compounds are used as the blowing agent, there can be from about 0.013 to about 0.50 gram mole, and preferably 0.040 to 0.30 gram mole of such blowing agent per 100 parts of linear olefinic polymer resin in the flowable gel or admixture. Although use of a single blowing agent is preferred, mixtures of two or more of such blowing agents may also be used.

The blowing agent is compounded into the flowable gel in proportions to make the desired degree of expansion in the resulting foamed cellular product to make products having foamed densities down to about 0.6 pcf. Depending on the amount of blowing agent added, the resulting foamed materials may have densities from aoout 0.6 to 15.0 pcf.

Crosslinking agents useful in the practice of the present invention include azido and vinyl functional silanes, organic peroxides, multifunctional vinyl monomers, and oxygen. The crosslinking agents of the present invention are added to the olefinic polymer gel with the blowing agent and serve to lightly crosslink the linear olefinic polymer with itself. This crosslinking increases the melt tension and melt viscosity of the polymer gel, while permitting the polymer to remain flowable. This light crosslinking of the polymer also permits pressure to build up in the extruder to 400 psig or above without prefoaming which is important in producing a closed cellular structured foam.

An important aspect of the present invention is the control of the amount of crosslinking agent to the polymer gel. Too much crosslinking agent causes melt fracture and poor foam quality. Too little crosslinking agent does not provide good foamability. The crosslinked melt must remain flowable without suffering severe melt fracture and should contain less than 10% gels by dissolution test in boiling xylene. In terms of melt index (ASTM D-1238 Condition N 190° C., 10 Kg), the lightly crosslinked polymer melt should have a melt index greater than about 0.1.

While all of the crosslinking agents utilized in the present invention are useful for producing linear olefinic polymer foams, the most preferred crosslinking agents are the azido functional silanes of the general formula R R'SiY$_2$, in which R represents an azido functional radical attached to silicon through a silicon to carbon bond and composed of carbon, hydrogen, optionally sulfur and oxygen, each Y represents a hydrolyzable organic radical, and R' represents a monovalent hydrocarbon radical or a hydrolyzable organic radical. While not wishing to be bound by any particular mechanism, it is believed that the azido silane crosslinking agent acts via two separate mechanisms, one of which forms reversible crosslinked bonds. In this reversible reaction, the azido silane compound grafts onto an olefinic polymer through a nitrine insertion reaction. Crosslinking develops through hydrolysis of the silanes to silanols followed by condensation of silanols to siloxanes. This reaction mechanism is explained more fully in my commonly assigned co-pending application Ser. No. 672,010, entitled Alcohol Control of Lightly Crosslinked Foamed Polymer Production filed concurrently with this application, to which reference is made.

Since the condensation reaction of silanols to siloxanes is catalyzed by the presence of certain metal catalysts such as dibutyl tin dilaurate or butyl tin maleate, it is preferred that when azido silanes are used as the crosslinking agent in the present invention, that a small amount of such catalyst also be added to the polymer melt. The crosslinking reaction is self-controlled in the extruder by the presence of a gaseous reaction product, namely an alcohol, which limits the reaction. However, the crosslinking reaction proceeds during foam expansion at the exit of the die as the alcohol diffuses into the gaseous phase with the volatile blowing agent.

In this manner, crosslinking of the polymer gel in the extruder is controlled so that the gel remains flowable until it exits the die to a zone of lower pressure. There, the crosslinking reaction proceeds, which stabilizes gas bubble and cell formation as the olefinic polymer is expanded. Because the degree of crosslinking in the extruder can be controlled, a greater proportion of azido silane crosslinking agent may be added and, a higher degree of crosslinking in resultant polymer foam may be obtained. Accordingly, the resultant polymer, crosslinked by azido silanes, may no longer be flowable and may contain a large amount of gels.

Suitable azido-functional silane compounds include the group of azido trialkoxysilanes such as 2-(trimethoxysilyl) ethyl phenyl sulfonyl azide (commercially available from Petrarch Systems, Inc., Bristol, Pa.) and (triethoxy silyl)hexyl sulfonyl azide (commercially available as Azcup D-98 from Hercules, Inc., Wilmington, Del.). The azido functional silane crosslinking agent is added in an amount between about 0.01 to 2.0 parts per hundred (pph), by weight, of linear olefinic polymer. An especially preferred range of addition is between 0.02 to 1.0 pph of azido silane crosslinking agent.

Other suitable silane crosslinking agents useful in the practice of the present invention include vinyl functional alkoxy silanes such as vinyl trimethoxy silane and vinyl triethoxy silane. These silane crosslinking agents may be represented by the general formula $RR'SiY_2$ in which R represents a vinyl functional radical attached to silicon through a silicon carbon bond and composed of carbon, hydrogen, and optionally oxygen or nitrogen, each Y represents a hydrolyzable oganic radical, and R' represents a hydrocarbon radical or Y. Further examples of such silanes are found in U.S. Pat. No. 3,646,155, which is specifically incorporated herein by reference.

Suitable organic peroxide crosslinking agents include dicumyl peroxide, commercially available under the trademark Dicup R from Hercules, Inc., Wilmington, Del. The organic peroxide crosslinking agents are preferably added in an amount between about 0.001 to 0.5 pph, and most preferably between 0.005 to 0.1 pph, of linear olefinic polymer. Suitable multifunctional vinyl monomer crosslinking agents for the present invention include trimethylolpropane triacrylate (TMPTA) and pentaerythritol triacrylate (PETA), both commercially available from Celanese Corp. The multifunctional vinyl monomer crosslinking agents are preferably added in an amount between about 0.01 to 2.0 pph, and most preferably between 0.1 to 1.0 pph, of linear olefinic polymer. Additionally, it has been found that the introduction of oxygen will initiate self-crosslinking of linear olefinic polymers by a free radical mechanism.

The crosslinking of linear olefinic polymers by organic peroxides, multifunctional vinyl monomers, and oxygen is believed to take place via a free radical mechanism in which tertiary hydrogens on the polymer are removed. However, since this type of reaction is irreversible, the amounts of crosslinking agent added should be closely controlled to prevent over-crosslinking of the polymer resulting in melt fracture.

In accordance with the process of the present invention, olefinic polymer foams may be made on conventional melt processing apparatus such as by continuous extrusion from a screw-type extruder. Such an extruder typically comprises a series of sequential zones including a feed zone, compression and melt zone, metering zone, and mixing zone. The barrel of the extruder may be provided with conventional electric heaters for zoned temperature control.

An inlet, such as a straight-through injection nozzle, is provided for adding a mixture of fluid blowing agent and crosslinking agent under pressure to the polymer in the extruder barrel between the metering and mixing zones. Crosslinking agent is pumped, in a controllable manner, into the stream of fluid blowing agent upstream of the injection nozzle. The blowing agent and crosslinking agent are compounded into the starting polymer in a conventional manner to form a flowable gel or admixture, preferably in a continuous manner. Thus, the polymer, blowing agent, and crosslinking agent may be combined in the mixing zone of an extruder using heat to plastify the polymer resin, pressure to maintain the blowing agent in a liquid state, and mechanical working to obtain thorough mixing.

The discharge end of the mixing zone of the extruder is connected, through a cooling and temperature control zone, to a die orifice. The hot polymer gel is cooled and then passed through the die orifice into a zone of lower pressure (e.g., normal ambient air atmosphere) where the blowing agent is activated and the polymer gel expands to a lower density, cellular mass. As the foamed extrusion forms, it is conducted away from the die and allowed to cool and harden.

In practice, the temperature of the feed zone is maintained at 180°±20° C., the temperature of the melting, metering, and mixing zones is maintained at 210°±20° C., and the temperature in the cooling and temperature control zone is maintained at 120°±20° C. The temperature of the polymer gel as it expands through the die orifice is preferably just above the temperature at which solid polymer would crystallize out of the gel and will vary depending upon the particular olefinic polymer utilized.

The resulting linear olefinic polymer foams comprise substantially closed-cell structures and are flexible to bending and shaping. The foams have excellent dimensional stability and high compressive strengths and heat distortion temperatures than branched low density polyethylene foams having an equivalent foam density.

As is conventional, finely divided solid materials such as talc, calcium silicate, zinc stearate, and the like can advantageously be incorporated with the polymer gel prior to expansion. Such finely divided materials aid in controlling the size of the cells and may be employed in amounts up to five percent by weight of the polymer. Numerous fillers, pigments, lubricants, and the like well known in the art can also be incorporated as desired. Antioxidants may be added to retard or suppress the crosslinking reaction. In such an instance where antioxidant is present in or added to the polymer gel, an additional amount of crosslinking agent may be required to achieve the desired degree of crosslinking.

The specific working examples that follow are intended to illustrate the invention but are not to be taken as limiting the scope thereof. In the examples, parts and percentages are by weight unless otherwise specified or required by the context.

EXAMPLE I

The apparatus used in this and other examples was a 1¼" screw type extruder having two additional zones for mixing and cooling at the end of usual sequential zones for feeding, melting, and metering. An opening for blowing agent injection was provided on the extruder barrel between the metering and mixing zones. A small syringe-type pump was connected to the blowing agent stream for injection of crosslinking agent. At the end of the cooling zone there was attached a die orifice having an opening of rectangular shape. The height of the opening, called die gap hereinafter, was adjustable while its width was fixed at 0.25".

A granular linear low density polyethylene (LLDPE), having 1.0 melt index (ASTM D-1238-79 Condition E) and 0.935 g/cc density was uniformly mixed witn 0.1 pph dibutyl tin dilaurate condensation catalyst (commercially available under the designation T-12, from M&T Chemical Inc.) and 0.1 pph talcum powder. The mixture was fed into the extruder at an essentially uniform rate of about 10 pounds per hour. FC-12 blowing agent (dichlorodifluoromethane) was injected into the extruder at a rate of 19.9 pph. The temperatures maintained at the extruder zones were: 170° C. at feeding zone, 220° C. at melting and metering zone, and 220° at mixing zone. The temperature of the cooling zone was adjusted so that the gel could be cooled down to about 123° C. throughout the tests. For each test, the die gap was varied to determine its effect on foam appearance. A predetermined amount of an azido functional silane was injected into the extruder to determine its effect on foaming performance.

The test results are summarized in Table I and FIG. 1. As can be seen from FIG. 1, a key to successful foam extrusion of a linear low density polyolefin is the ability to build the die pressure to approximately 400 psig or above. This appears to be an approximate line of demarcation between good and poor foams in appearance.

Without addition of azido silane, the LLDPE foam partially collapsed at a larger die gap. The die had to be closed to 0.06" to substantially prevent the foam from collapsing. At this small die gap, the foam had a very small cross section, a high level of open cells, a high density, some voids in the cross-section, and ripple on the edges. The foam was not of satisfactory quality. When 0.05 pph of an azido silane was added, the foam quality improved dramatically with the pressure increased both at the die and extruder discharge. At a die gap as large as 0.110 inches, a good quality foam having a larger cross section, low density, and low open cell content was achieved. The foam strand was straight with no sign of flow instability. The foam looked even better at 0.075 pph silane level. Excellent quality foam was produced at a die gap as large as 0.145'. At 0.10 pph silane level, an even larger cross sectioned foam was achieved. The foam looked good but there developed a slight sign of over-crosslinking as exhibited by a slightly higher level of open cells.

The LLDPE foams thus produced with low cost FC-12 blowing agent had good dimensional stability during aging. This feature is remarkable in that a foam produced from a branched chain low density polyethylene using the same blowing agent shrinks as much as 30% during aging. The LLDPE foams also had a heat distortion temperature of 115° C., which is 15° C. higher than that for a typical low density polyethylene foam (LDPE). The heat distortion temperature is the highest temperature at which a foam shrinks no more than 5% in volume during one hour aging.

TABLE I

| Test No. | FC-12 Level (pph) (1) | Azido Silane Level (pph) (2) | Gel Temp. (°C.) (3) | Die Gap (in) (4) | Die Press. (psig) (5) | Extruder Press. (psig) (6) | Foam Thick. (in) (7) | Foam Width (in) (8) | Foam Density (pcf) (9) | Cell Size (mm) (10) | Open Cell (%) (11) | Foam Appear. (12) | Flow Stab. (13) |
|---|---|---|---|---|---|---|---|---|---|---|---|---|---|
| 1 | 19.9 | — | 123 | 0.115 | 300 | 1295 | 0.56 | 0.85 | 2.64 | 0.42 | 85 | PC | — |
|   |      |   |     | 0.105 | 300 | 1300 | 0.53 | 0.87 | 2.80 | 0.34 | 81 | PC | — |
|   |      |   |     | 0.070 | 338 | 1375 | 0.38 | 0.90 | 2.65 | 0.33 | 60 | B  | R |
|   |      |   |     | 0.060 | 363 | 1380 | 0.35 | 0.87 | 1.91 | 0.30 | 24 | V  | R |
| 2 | 19.9 | 0.05 | 123 | 0.115 | 380 | 1570 | 0.89 | 1.12 | 1.70 | 0.42 | 14 | G | R |
|   |      |   |     | 0.110 | 403 | 1610 | 0.85 | 1.13 | 1.64 | 0.42 | 10 | E | E |
|   |      |   |     | 0.105 | 412 | 1620 | 0.83 | 1.13 | 1.52 | 0.37 | 8  | E | E |
| 3 | 19.9 | 0.075 | 123 | 0.155 | 450 | 1680 | 1.00 | 1.20 | 1.60 | 0.56 | 16 | G | E |
|   |      |   |     | 0.145 | 455 | 1700 | 1.04 | 1.20 | 1.61 | 0.60 | 12 | E | E |
|   |      |   |     | 0.140 | 460 | 1730 | 1.07 | 1.22 | 1.64 | 0.65 | 9  | E | E |
|   |      |   |     | 0.130 | 450 | 1700 | 0.99 | 1.20 | 1.60 | 0.60 | 8  | E | E |
| 4 | 19.9 | 0.10 | 123 | 0.210 | 450 | 1770 | 1.26 | 1.32 | 1.74 | 0.68 | 24 | H | R |
|   |      |   |     | 0.200 | 460 | 1810 | 1.28 | 1.30 | 1.91 | 1.01 | 27 | E | E |

(1) difluorodichloromethane mixed in per hundred parts of polymer
(2) parts of effective azido functional silane mixed in per hundred parts of polymer; the azido silane used was C-T2905, a 50/50 by weight solution of 2-(trimethoxysilyl ethylphenylsulfonyl azide) in methylene chloride marketed by Petrarch Systems, Inc.
(3) temperature in degrees centigrade to which the gel was cooled down prior to foam expansion
(4) gap of die opening in inches at which samples were taken
(5), (6) pressure in pounds per square inch at the die and at the extruder discharge, respectively
(7), (8) thickness and width of foam body in inches measured within about five minutes after extrusion
(9) density of foam body in pounds per cubic foot measured in about one month
(10) open cell content in percent determined per ASTM D-2856-A
(11) cell size in millimeter in horizontal direction determined per ASTM D-3576
(12) subjective judgment of foam appearance; C = total collapse, PC = partial collapse, O = open cells, B = blips or large voids contained in the foam, V = voids of smaller dimensions contained in the foam, H = hairy skin originating from prefoaming, G = good, E = excellent
(13) the behavior of extrudate; W = wobbly strand, S = surging, R = ripples at the edges, F = melt fracture; G = good, E = excellent

EXAMPLE II

The tests in this example employed the same apparatus, polymer composition, and operation conditions as in Example I. An 80/20 mixture of FC-12/ethanol was used as the blowing agent in order to see the effect of alcohol on the crosslinking.

The test results are set forth in Table II. In this example, which is not a part of the present invention, but rather a part of the subject matter of copending application Ser. No. 672,010, referred to above, it is shown that alcohol suppressed line pressures for formulations crosslinked with an azido functional silane.

Figure 4:
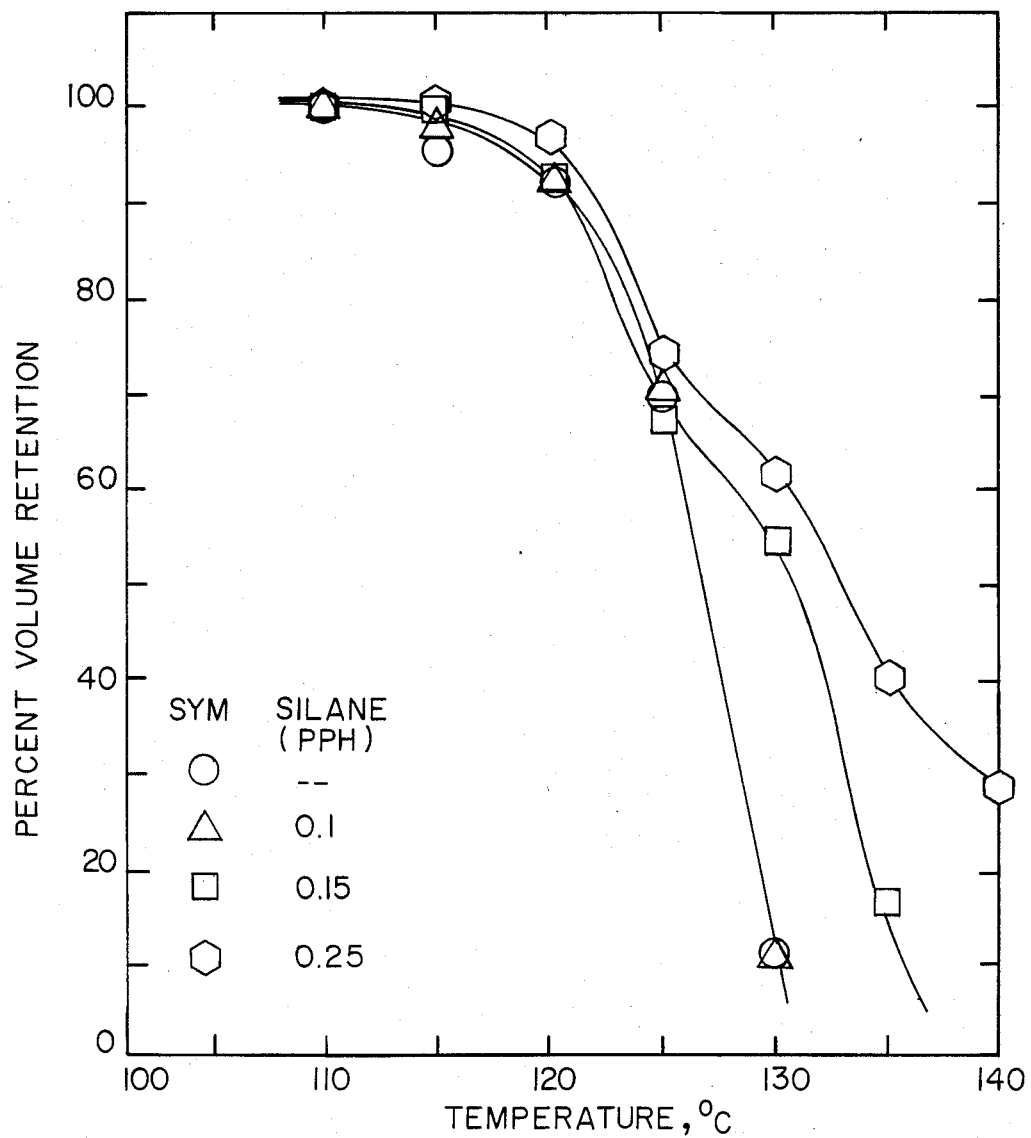
FIG. 4 is a graph of the thermocollapse resistance (percent volume retention versus temperature) for linear low density polyethylene (2.3 melt index, 0.935 gm/cc density) foams crosslinked with different levels of an azido silane and using a 80/20 by weight blend of FC-12 and ethanol as a blowing agent.

Although not as dramatic as in Example I, the effects of silane were evident in one or more areas of foaming performance. Good quality foams were obtained at the silane levels of 0.1 to 0.15 pph. At a 0.25 pph silane level, the foam strand fractured signifying over-crosslinking. As shown in FIG. 4, the foams made with 0.15 and 0.25 pph silane showed some thermo-collapse resistance during oven aging tests. That is, these foams retained over 50% of their original volume during aging in 130° C. oven for one hour while the control (Test No.1) and those containing a lower level of silane collapsed totally during the test.

EXAMPLE III

The same apparatus, polymer, and operating procedure as in Example I were also employed in this example. A small amount (0.05 pph) of organotin catalyst (T-12) was added to all formulations in this example. The talc level was varied from 0.1 to 0.7 pph for cell size control. A 90/10 by weight mixture of FC-12/MeCl₂ was used as the blowing agent. A predetermined amount of an azido functional silane was mixed in the blowing agent. The extruder zones were maintained at 170°, 200°, and 200° C. for feeding zone, melting and metering zone and mixing zone, respectively. The gel temperature was maintained at about 128° C. The die gap was fixed at 0.100 inch for all tests except for Test No. 5 in which the foam appearance at 0.200 inch die gap was also observed. Also in Test No. 5, a small amount (1.0 pph) of methanol was mixed in to determine its effect. The test results are given in Table III.

Without the crosslinking agent, the foam was of poor quality with small cross section, some voids, rough skin, and rippled edges in spite of its substantially closed cell structure. When a small amount (0.125 pph) of an azido functional silane was added, an excellent quality foam was obtained. At the silane level of 0.15 pph, melt fracture developed. Cutting the level of nucleator did not improve foam quality. When the alcohol-containing blowing agent was injected, the melt fracture disappeared and an excellent quality foam of large cross section was obtained. The die could be opened as wide as 0.200" without incurring prefoaming although more open cells developed in the foam. The LLDPE foams produced in this example showed good dimensional stability during ambient aging and a high heat distortion temperature of 115° C.

EXAMPLE IV

The apparatus used in this example and its operating procedure were the same as used in Example I. A high density linear polyethylene (HDPE) having 0.6 melt index (ASTM D-1238-79 Condition E) and 0.963 g/cc density was used in this example. The polymer granules were mixed with 0.05 pph talc and 0.05 pph organotin catalyst (T-12). The mixture was fed into the extruder at 10 pounds per hour. Extruder zones were maintained at 160°, 200° and 200° C. for feeding, melting and metering, and mixing zone, respectively. The gel temperature was fixed at 132° C. for all tests. The test results are set forth in Table IV.

TABLE II

| Test No. | BA Level (pph) (1) | Azido Silane Level (pph) (2) | Gel Temp. (°C.) (3) | Die Gap (in) (4) | Die Press. (psig) (5) | Extruder Press. (psig) (6) | Foam Thick. (in) (7) | Foam Width (in) (8) | Foam Density (pcf) (9) | Cell Size (mm) (10) | Open Cell (%) (11) | Foam Appear. (12) | Flow Stab. (13) |
|---|---|---|---|---|---|---|---|---|---|---|---|---|---|
| 1 | 18.0 | — | 123 | 0.115 | 278 | 1350 | 0.66 | 0.96 | 1.78 | 0.56 | 67 | PC | — |
|   |      |   |     | 0.105 | 290 | 1390 | 0.71 | 1.20 | 1.77 | 0.52 | 68 | B  | R |
|   |      |   |     | 0.080 | 315 | 1380 | 0.48 | 1.01 | 1.74 | 0.95 | 50 | B  | R |
|   |      |   |     | 0.075 | 320 | 1390 | 0.52 | 0.90 | 1.59 | 0.46 | 28 | G  | R |
|   |      |   |     | 0.070 | 369 | 1405 | 0.45 | 0.95 | 1.70 | 0.54 | 15 | E  | G |
| 2 | 18.0 | 0.05 | 123 | 0.090 | 322 | 1440 | 0.52 | 0.95 | 1.52 | 0.52 | 16 | B,H | R |
|   |      |   |     | 0.080 | 380 | 1460 | 0.54 | 1.06 | 1.33 | 0.46 | 16 | G  | R |
|   |      |   |     | 0.075 | 385 | 1480 | 0.48 | 0.97 | 1.48 | 0.54 | 20 | E  | R |
|   |      |   |     | 0.070 | 360 | 1570 | 0.54 | 1.05 | 1.42 | 0.33 | 11 | E  | E |
| 3 | 18.0 | 0.075 | 123 | 0.090 | 365 | 1480 | 0.60 | 0.90 | 1.65 | 0.45 | 19 | H  | R |
|   |      |   |     | 0.080 | 343 | 1510 | 0.55 | 1.02 | 1.59 | 0.46 | 20 | E  | R |
|   |      |   |     | 0.075 | 350 | 1320 | 0.53 | 0.98 | 1.54 | 0.41 | 15 | E  | E |
| 4 | 18.7 | 0.10 | 123 | 0.090 | 400 | 1520 | 0.61 | 0.91 | 1.58 | 0.39 | 16 | H  | R |
|   |      |   |     | 0.080 | 410 | 1550 | 0.55 | 1.05 | 1.87 | 0.40 | 20 | G  | R |
|   |      |   |     | 0.075 | 437 | 1605 | 0.54 | 1.06 | 1.48 | 0.38 | 8  | E  | E |
| 5 | 18.7 | 0.15 | 123 | 0.090 | 418 | 1610 | 0.54 | 1.05 | 1.60 | 0.46 | 14 | G  | R |
|   |      |   |     | 0.080 | 460 | 1660 | 0.54 | 1.03 | 1.80 | 0.35 | 9  | E  | R |
|   |      |   |     | 0.075 | 558 | 1770 | 0.56 | 1.08 | 1.46 | 0.42 | 7  | E  | E |
| 6 | 18.0 | 0.25 | 123 | 0.160 | 483 | 1750 | 1.02 | 1.19 | 1.52 | 0.41 | 16 | E  | F |
|   |      |   |     | 0.150 | 500 | 1910 | 1.06 | 1.25 | 1.57 | 0.39 | 12 | E  | F |

(1) an 80/20 by weight mixture of FC-12 and ethanol mixed in per hundred parts of polymer
(2) parts of effective azido functional silane mixed in per hundred parts of polymer; the azido silane used was C-T2905, 50/50 by weight solution of 2-(trimethoxysilyl ethylphenylsulfonyl azide) in methylene chloride marketed by Petrarch Systems, Inc.
(3) temperature in degrees centigrade to which the gel was cooled down prior to foam expansion
(4) gap of die opening in inches at which samples were taken
(5), (6) pressure in pounds per square inch at the die and at the extruder discharge, respectively
(7), (8) thickness and width of foam body in inches measured within about five minutes after extrusion
(9) density of foam body in pounds per cubic foot measured in about one month
(10) open cell content in percent determined per ASTM D-2856-A
(11) cell size in millimeter in horizontal direction determined per ASTM D-3576
(12) subjective judgment of foam appearance; C = total collapse, PC = partial collapse, O = open cells B = blips or large voids contained in the foam, V = voids of smaller dimensions contained in the foam, H = hairy skin originating from prefoaming, G = good, E = excellent
(13) the behavior of extrudate, W = wobbly strand, S = surging, R = ripples at the edges, F = melt fracture, G = good, E = excellent

TABLE III

| Test No. | BA Level (pph) (1) | Azido Silane Level (pph) (2) | Talc Level (pph) (14) | Gel Temp. (°C.) (3) | Die Gap (in) (4) | Die Press. (psig) (5) | Extruder Press. (psig) (6) | Foam Thick. (in) (7) | Foam Width (in) (8) | Foam Density (pcf) (9) | Cell Size (mm) (10) | Open Cell (%) (11) | Foam Appear. (12) | Flow Stab. (13) |
|---|---|---|---|---|---|---|---|---|---|---|---|---|---|---|
| 1 | 20.3 | 0     | 0.7 | 128 | 0.10 | —   | —    | 0.52 | 0.86 | 2.25 | 0.33 | 0.1 | B | R |
| 2 | 19.7 | 0.125 | 0.7 | 128 | 0.10 | 325 | 1200 | 0.68 | 1.10 | 1.98 | 0.40 | 31  | E | E |
| 3 | 19.7 | 0.15  | 0.7 | 128 | 0.10 | 370 | 1300 | —    | —    | —    | —    | —   | V | F |
| 4 | 19.7 | 0.15  | 0.2 | 130 | 0.10 | 530 | 1500 | 0.65 | 0.99 | 2.28 | 0.36 | 73  | V | F |
| 5 | 18.7 | 0.15  | 0.1 | 129 | 0.10 | 505 | 1450 | 0.70 | 1.10 | 1.97 | 0.51 | 47  | E | E |

TABLE III-continued

| Test No. | BA Level (pph) (1) | Azido Silane Level (pph) (2) | Talc Level (pph) (14) | Gel Temp. (°C.) (3) | Die Gap (in) (4) | Die Press. (psig) (5) | Extruder Press. (psig) (6) | Foam Thick. (in) (7) | Foam Width (in) (8) | Foam Density (pcf) (9) | Cell Size (mm) (10) | Open Cell (%) (11) | Foam Appear. (12) | Flow Stab. (13) |
| --- | --- | --- | --- | --- | --- | --- | --- | --- | --- | --- | --- | --- | --- | --- |
| | | | | | 20 | — | — | 1.32 | 1.04 | 2.33 | 0.62 | 80 | G | E |

(1) difluorodichloromethane mixed in per hundred parts of polymer
(2) parts of effective azido functional silane mixed in per hundred parts of polymer; the azido silane used was C-T2905, a 50/50 by weight solution of 2-(trimethoxysilyl ethylphenylsulfonyl azide) in methylene chloride marketed by Petrarch Systems, Inc.
(3) temperature in degrees centigrade to which the gel was cooled down prior to foam expansion
(4) gap of die opening in inches at which samples were taken
(5), (6) pressure in pounds per square inch at the die and at the extruder discharge, respectively
(7), (8) thickness and width of foam body in inches measured within about five minutes after extrusion
(9) density of foam body in pounds per cubic foot measured in about one month
(10) open cell content in percent determined per ASTM D-2856-A
(11) cell size in millimeter in horizontal direction determined per ASTM D-3576
(12) subjective judgment of foam appearance; C = total collapse, PC = partial collapse, O = open cells, B = blips or large voids contained in the foam, V = voids of smaller dimensions contained in the foam, H = hairy skin originating from prefoaming, G = good, E = excellent
(13) the behavior of extrudate; W = wobbly strand, S = surging, R = ripples at the edges, F = melt fracture G = good, E = excellent
(14) parts of talcum powder mixed in per hundred parts of polymer

TABLE IV

| Test No. | BA Level (pph) (1) | Azido Silane Level (pph) (2) | Gel Temp. (°C.) (3) | Die Gap (in) (4) | Die Press. (psig) (5) | Extruder Press. (psig) (6) | Foam Thick. (in) (7) | Foam Width (in) (8) | Foam Density (pcf) (9) | Cell Size (mm) (10) | Open Cell (%) (11) | Foam Appear. (12) | Flow Stab. (13) |
| --- | --- | --- | --- | --- | --- | --- | --- | --- | --- | --- | --- | --- | --- |
| 1 | 17.7 | — | 132 | 0.100 | 270 | 1180 | 0.73 | 0.98 | 2.13 | 0.58 | 92.0 | PC | — |
|   |      |   |     | 0.090 | 280 | 1195 | 0.65 | 0.86 | 2.42 | 0.51 | 92.1 | PC | — |
| 2 | 17.4 | 0.1 | 132 | 0.110 | 350 | 1250 | 0.90 | 1.34 | 1.83 | 1.25 | 94.6 | B | W |
|   |      |   |     | 0.100 | 350 | 1260 | 0.83 | 1.27 | 1.55 | 1.01 | 89.7 | V | G |
|   |      |   |     | 0.090 | 370 | 1290 | 0.76 | 1.29 | 1.54 | 0.74 | 90.6 | G | G |
| 3 | 17.4 | 0.15 | 132 | 0.110 | 385 | 1360 | 1.10 | 1.30 | 1.60 | 1.16 | 47.6 | V | W |
|   |      |   |     | 0.105 | 400 | 1375 | 0.97 | 1.26 | 1.53 | 0.95 | 53.4 | G | W |
|   |      |   |     | 0.100 | 420 | 1390 | 0.98 | 1.26 | 1.45 | 0.90 | 25.1 | E | E |

(1) difluorodichloromethane mixed in per hundred parts of polymer
(2) parts of effective azido functional silane mixed in per hundred parts of polymer; the azido silane used was C-T2905, a 50/50 by weight solution of 2-(trimethoxysilyl ethylphenylsulfonyl azide) in methylene chloride marketed by Petrarch Systems, Inc.
(3) temperature in degrees centigrade to which the gel was cooled down prior to foam expansion
(4) gap of die opening in inches at which samples were taken
(5), (6) pressure in pounds per square inch at the die and at the extruder discharge, respectively
(7), (8) thickness and width of foam body in inches measured within about five minutes after extrusion
(9) density of foam body in pounds per cubic foot measured in about one month
(10) open cell content in percent determined per ASTM D-2856-A
(11) cell size in millimeter in horizontal direction determined per ASTM D-3576
(12) subjective judgment of foam appearance; C = total collapse, PC = partial collapse, O = open cells, B = blips or large voids contained in the foam, V = voids of smaller dimensions contained in the foam, H = hairy skin originating from prefoaming, G = good, E = excellent
(13) the behavior of extrudate; W = wobbly strand, S = surging, R = ripples at the edges, F = melt fracture G = good, E = excellent The effect of an azido silane on the foaming was even more dramatic during the tests in this example. Without silane, a good foam could not be produced, but with 0.15 pph silane excellent quality substantially closed cell foam was achieved. The foams expanded by low cost FC-12 blowing agent showed excellent dimensional stability during ambient aging with shrinkage no more than 3%. This is a remarkable improvement over a LDPE foam made with FC-12 blowing agent. The heat distortion temperature of the HDPE foams was about 125° C. which is about 25° C. higher than that of a typical LDPE foam.

EXAMPLE V

In this example, the same apparatus, operating conditions, and polymer composition were used, as in Example IV, except for gel temperature and blowing agent. The gel temperature was maintained at about 130° C. and a 90/10 mixture of FC-12/EtOH was used as the blowing agent. The test results are presented in Table V.

Again, the silane crosslinking agent aided in foam processing and alcohol suppressed development of crosslinking in the extrusion line. At a low silane level, improvements were seen in one or more performance areas. For example, even at 0.05 pph silane level, foam density dropped significantly from the control. At 0.15 pph silane level, good quality foams were produced with a noticeable increase in the die pressure. Interestingly, the pressure at extruder discharge increased little at this silane level. This is an advantage in foam extrusion process since a high die pressure prevents prefoaming but a low extruder discharge pressure facilitates polymer extrusion. The trend indicates that the alcohol-containing blowing agent called for a silane level higher than 0.15 pph for the optimum results.

EXAMPLE VI

The apparatus used in this example was the same as in Example I. A Hercules Porofax 6523 polypropylene resin having 4.0 melt index (ASTM D-1738 Condition L) was used. The polymer was mixed with 0.1 pph talc and 0.05 pph organotin catalyst (T-12) and fed into the extruder at a uniform rate of 10 pounds per hour. A 90/10 by weight mixture of FC-12 and methylene chloride was injected into the extruder at a rate of 27.8 pph. Extruder zones were maintained at 180°, 200° and 210° C. for feeding, melting and metering, and mixing zone, respectively. The gel temperature was kept at an essentially constant level of 146° C. The data are summarized in Table VI. In this example also, addition of an azido functional silane improved foam processability of polypropylene. The polypropylene foams did not shrink at all during aging and had a heat distortion temperature as high as 165° C.

example was an 80/20 mixture of a linear low density polyethylene that was used in Example I and a polystyrene having weight average molecular weight of about 200,000.

EXAMPLE VII

TABLE V

| Test No. | BA Level (pph) (1) | Azido Silane Level (pph) (2) | Gel Temp. (°C.) (3) | Die Gap (in) (4) | Die Press. (psig) (5) | Extruder Press. (psig) (6) | Foam Thick. (in) (7) | Foam Width (in) (8) | Foam Density (pcf) (9) | Cell Size (mm) (10) | Open Cell (%) (11) | Foam Appear. (12) | Flow Stab. (13) |
|---|---|---|---|---|---|---|---|---|---|---|---|---|---|
| 1 | 17.8 | — | 129 | 0.105 | 265 | 1200 | 0.76 | 1.19 | 2.27 | 0.45 | 84.2 | B | W |
|   |      |     |     | 0.100 | 260 | 1190 | 0.82 | 1.17 | 2.19 | 0.41 | 82.9 | V | W |
| 2 | 17.8 | 0.05 | 130 | 0.105 | 260 | 1180 | 0.71 | 1.18 | 1.75 | 0.48 | 87.4 | V | W |
| 3 | 17.8 | 0.075 | 130 | 0.105 | 300 | 1190 | 0.83 | 1.20 | 1.80 | 0.48 | 87.7 | V | W |
| 4 | 17.8 | 0.10 | 130 | 0.110 | 288 | 1160 | 0.78 | 1.16 | 1.81 | 0.39 | 84.7 | V | W |
|   |      |      |     | 0.105 | 280 | 1160 | 0.70 | 1.07 | 1.76 | 0.40 | 85.9 | V | G |
|   |      |      |     | 0.100 | 300 | 1160 | 0.78 | 1.22 | 1.66 | 0.70 | 61.8 | V | W |
| 5 | 17.8 | 0.15 | 130 | 0.110 | 310 | 1200 | 0.96 | 1.24 | 1.50 | 0.74 | 57.3 | G | G |
|   |      |      |     | 0.105 | 310 | 1195 | 0.80 | 1.18 | 1.49 | 0.60 | 56.5 | G | G |
|   |      |      |     | 0.100 | 380 | 1250 | 0.95 | 1.21 | 1.44 | 0.90 | 46.8 | G | G |

(1) parts of 90/10 by weight mixture of FC-12/ethanol mixed in per hundred parts of polymer
(2) parts of effective azido functional silane mixed in per hundred parts of polymer; the azido silane used was C-T2905, a 50/50 by weight solution of 2-(trimethoxysilyl ethylphenylsulfonyl azide) in methylene chloride marketed by Petrarch Systems, Inc.
(3) temperature in degrees centigrade to which the gel was cooled down prior to foam expansion
(4) gap of die opening in inches at which samples were taken
(5), (6) pressure in pounds per square inch at the die and at the extruder discharge, respectively
(7), (8) thickness and width of foam body in inches measured within about five minutes after extrusion
(9) density of foam body in pounds per cubic foot measured in about one month
(10) open cell content in percent determined per ASTM D-2856-A
(11) cell size in millimeter in horizontal direction determined per ASTM D-3576
(12) subjective judgment of foam appearance; C = total collapse, PC = partial collapse, O = open cells, B = blips or large voids contained in the foam, V = voids of smaller dimensions contained in the foam, H = hairy skin originating from prefoaming, G = good, E = excellent
(13) the behavior of extrudate; W = wobbly strand, S = surging, R = ripples at the edges, F = melt fracture G = good, E = excellent

TABLE VI

| Test No. | BA Level (pph) (1) | Azido Silane Level (pph) (2) | Gel Temp. (°C.) (3) | Die Gap (in) (4) | Die Press. (psig) (5) | Extruder Press. (psig) (6) | Foam Thick. (in) (7) | Foam Width (in) (8) | Foam Density (pcf) (9) | Cell Size (mm) (10) | Open Cell (%) (11) | Foam Appear. (12) | Flow Stab. (13) |
|---|---|---|---|---|---|---|---|---|---|---|---|---|---|
| 1 | 27.8 | — | 146 | 0.040 | 310 | 1010 | ND | ND | ND | ND | ND | H | R,W |
|   |      |     |     | 0.023 | 520 | 1350 | 0.39 | 0.85 | 1.21 | 0.38 | 6.7 | H | R,W |
| 2 | 27.8 | 0.075 | 146 | 0.040 | 330 | 1000 | 0.52 | 0.86 | ND | ND | ND | H | R,W |
|   |      |       |     | 0.030 | 350 | 1050 | 0.50 | 0.84 | 1.16 | 0.45 | 10.2 | E | E |
| 3 | 27.8 | 0.12 | 146 | 0.040 | 350 | 900 | 0.53 | 0.83 | 1.46 | 0.85 | 32.5 | E | R,W |

ND = not determined
(1) parts of 90/10 by weight mixture of FC-12/methylene chloride mixed in per hundred parts of polymer
(2) parts of effective azido functional silane mixed in per hundred parts of polymer; the azido silane used was C-T2905, a 50/50 by weight solution of 2-(trimethoxysilyl ethylphenylsulfonyl azide) in methylene chloride marketed by Petrarch Systems, Inc.
(3) temperature in degrees centigrade to which the gel was cooled down prior to foam expansion
(4) gap of die opening in inches at which samples were taken
(5), (6) pressure in pounds per square inch at the die and at the extruder discharge, respectively
(7), (8) thickness and width of foam body in inches measured within about five minutes after extrusion
(9) density of foam body in pounds per cubic foot measured in about one month
(10) open cell content in percent determined per ASTM D-2856-A
(11) cell size in millimeter in horizontal direction determined per ASTM D-3576
(12) subjective judgment of foam appearance; C = total collapse, PC = partial collapse, O = open cells, B = blips or large voids contained in the foam, V = voids of smaller dimensions contained in the foam, H = hairy skin originating from prefoaming, G = good, E = excellent
(13) the behavior of extrudate; W = wobbly strand, S = surging, R = ripples at the edges, F = melt fracture G = good, E = excellent The same apparatus used in Example I was used in this example. The polymer feedstock employed in this

TABLE VII

| Test No. | BA Level (pph) (1) | Azido Silane Level (pph) (2) | Gel Temp. (°C.) (3) | Die Gap (in) (4) | Die Press. (psig) (5) | Extruder Press. (psig) (6) | Foam Thick. (in) (7) | Foam Width (in) (8) | Foam Density (pcf) (9) | Cell Size (mm) (10) | Open Cell (%) (11) | Foam Appear. (12) | Flow Stab. (13) |
|---|---|---|---|---|---|---|---|---|---|---|---|---|---|
| 1 | 20.3 | — | 122 | 0.070 | 328 | 1020 | 0.42 | 1.06 | 1.91 | 0.42 | 92.5 | PC | — |
|   |      |     |     | 0.065 | 332 | 1040 | 0.43 | 1.03 | 2.14 | 0.44 | 93.2 | PC | — |
|   |      |     |     | 0.060 | 342 | 1050 | 0.42 | 1.04 | 1.76 | 0.43 | 95.6 | PC | — |
|   |      |     |     | 0.055 | 348 | 1070 | ND | ND | ND | ND | ND | B | W,R |
|   |      |     |     | 0.050 | 430 | 1150 | 0.53 | 1.17 | 1.39 | 0.32 | 20.7 | E | E |
| 2 | 21.0 | 0.1 | 122 | 0.070 | 330 | 1040 | 0.66 | 1.10 | 2.00 | 0.42 | 92.9 | PC | — |
|   |      |     |     | 0.065 | 330 | 1050 | 0.43 | 1.05 | 1.51 | 0.39 | 87.9 | PC | — |
|   |      |     |     | 0.060 | 332 | 1060 | 0.44 | 1.03 | 1.70 | 0.43 | 85.9 | B | W |
|   |      |     |     | 0.055 | 339 | 1090 | 0.43 | 1.10 | 2.15 | 0.40 | 83.8 | B | W |
|   |      |     |     | 0.050 | 420 | 1250 | 0.50 | 1.28 | 1.44 | 0.32 | 7.20 | E | G |
| 3 | 21.0 | 0.15 | 122 | 0.080 | 365 | 1150 | 0.70 | 1.14 | 1.45 | 0.46 | 50.1 | B | W |
|   |      |     |     | 0.070 | 372 | 1180 | 0.65 | 1.24 | 1.42 | 0.32 | 36.3 | V | W |

TABLE VII-continued

| Test No. | BA Level (pph) (1) | Azido Silane Level (pph) (2) | Gel Temp. (°C.) (3) | Die Gap (in) (4) | Die Press. (psig) (5) | Extruder Press. (psig) (6) | Foam Thick. (in) (7) | Foam Width (in) (8) | Foam Density (pcf) (9) | Cell Size (mm) (10) | Open Cell (%) (11) | Foam Appear. (12) | Flow Stab. (13) |
|---|---|---|---|---|---|---|---|---|---|---|---|---|---|
|  |  |  |  | 0.065 | 380 | 1200 | 0.60 | 1.14 | 1.26 | 0.35 | 22.9 | V | G |
|  |  |  |  | 0.060 | 390 | 1240 | 0.63 | 1.17 | 1.32 | 0.35 | 10.3 | E | G |
|  |  |  |  | 0.055 | 442 | 1330 | 0.60 | 1.25 | 1.19 | 0.32 | 8.3 | E | E |
| 4 | 21.0 | 0.2 | 122 | 0.080 | 410 | 1220 | 0.75 | 1.18 | 1.24 | 0.34 | 3.7 | V | W |
|  |  |  |  | 0.075 | 415 | 1250 | 0.70 | 1.20 | 1.41 | 0.37 | 10.0 | E | E |
|  |  |  |  | 0.070 | 425 | 1300 | 0.72 | 1.25 | 1.38 | 0.40 | 8.5 | E | E |
| 5 | 21.0 | 0.25 | 122 | 0.080 | 440 | 1325 | 0.72 | 1.28 | 1.26 | 0.36 | 9.2 | E | G |
|  |  |  |  | 0.075 | 460 | 1350 | 0.77 | 1.22 | 1.42 | 0.37 | 15.4 | E | E |
|  |  |  |  | 0.070 | 510 | 1600 | 0.75 | 1.28 | 1.17 | 0.36 | 11.0 | E | E |

Figure 2:
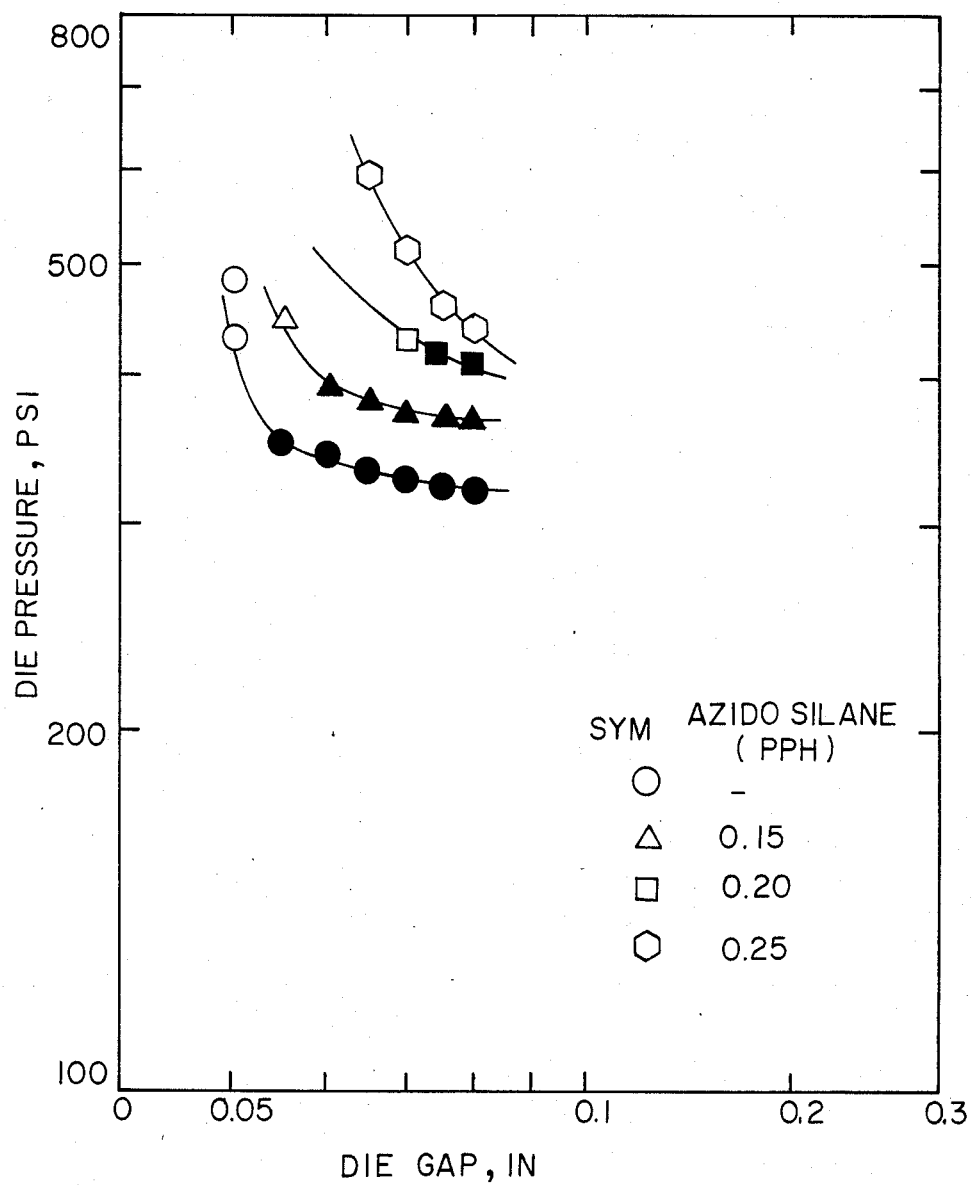
FIG. 2 is a graph of die pressure versus die gap for an 80/20 by weight blend of linear low density polyethylene (1.0 melt index, 0.935 gm/cc density) and polystyrene (average mol. wt. of 200,000) foam crosslinked with an azido silane and using a 95/5 by weight blend of FC-12 and ethanal as a blowing agent; filled symbols indicate prefoaming.

ND = not determined
(1) parts of 95/5 by weight mixture of FC-12/ethanol mixed in per hundred parts of polymer
(2) parts of effective azido functional silane mixed in per hundred parts of polymer; the azido silane used was C-T2905, a 50/50 by weight solution of 2-(trimethoxysilyl ethylphenylsulfonyl azide) in methylene chloride marketed by Petrarch Systems, Inc.
(3) temperature in degrees centigrade to which the gel was cooled down prior to foam expansion
(4) gap of die opening in inches at which samples were taken
(5), (6) pressure in pounds per square inch at the die and at the extruder discharge, respectively
(7), (8) thickness and width of foam body in inches measured within about five minutes after extrusion
(9) density of foam body in pounds per cubic foot measured in about one month
(10) open cell content in percent determined per ASTM D-2856-A
(11) cell size in millimeter in horizontal direction determined per ASTM D-3576
(12) subjective judgment of foam appearance; C = total collapse, PC = partial collapse, O = open cells, B = blips or large voids contained in the foam, V = voids of smaller dimensions contained in the foam, H = hairy skin originating from prefoaming, G = good, E = excellent
(13) the behavior of extrudate; W = wobbly strand, S = surging, R = ripples at the edges, F = melt fracture G = good, E = excellent Two granular polymers were blended by use of a tumbler, mixed with 0.1 pph talc and 0.05 pph organotin catalyst (T-12) and fed to the extruder at an esentially uniform rate of 10 pounds per hour. A 95/5 by weight mixture of FC-12/ethanol was injected into the extruder at a rate of approximately 21.0 pph. Extruder zones were maintained at 145°, 195° and 205° C., respectively, for feeding, melting and metering, and mixing zone, respectively. The gel was cooled down to an essentially uniform temperature of about 122° C. The test results are seen in Table VII and FIG. 2.

This particular polymer blend provided reasonably good foam without crosslinking when the die gap was closed down to 0.050 inch. The foam had a small cross section and a relatively high level of open cells. At a larger die gap, foam collapsed partially. Foam improved progressively with the azido functional silane level. At a silane level of 0.15 pph or higher, superb-looking foams were obtained having a lower density, larger cross section, and lower open cell content. At a silane level as high as 0.25 pph, there was no sign of over-crosslinking. Again, a die pressure of approximately 400 psig was the line of demarcation between good and poor foams.

The foams thus produced also had excellent dimensional stability during aging without suffering any shrinkage. The heat distortion temperature of the blend foams was about 110° C.

EXAMPLE VIII

Figure 3:
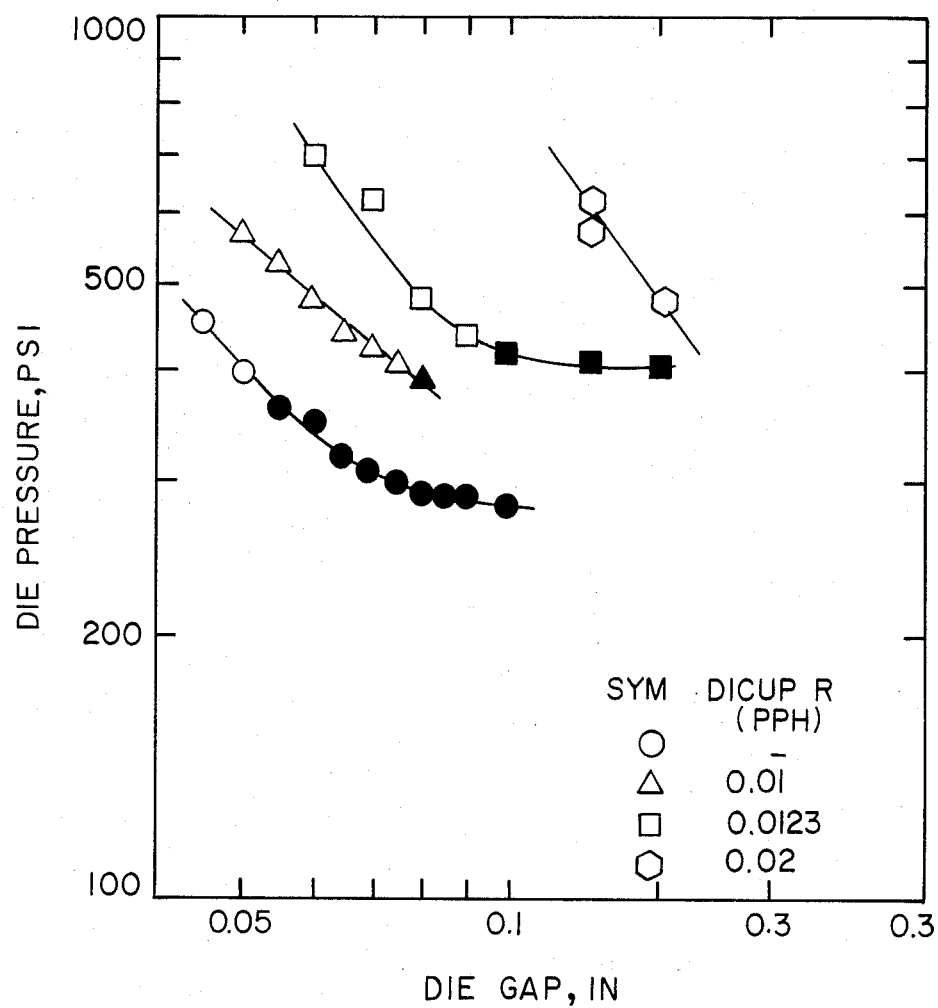
FIG. 3 is a graph of die pressure versus die gap for a linear low density polyethylene (1.0 melt index, 0.935 gm/cc density) foam crosslinked with dicumyl peroxide; filled symbols indicate prefoaming.

The apparatus, operating procedure, and polymer used in this example were the same as in Example I. Polymer granules were adhered with 0.05 pph talc by use of a wetting agent and fed into the extruder. FC-12 blowing agent was injected into the extruder at an essentially uniform rate of 19.7 pph. A predetermined amount of dicumyl peroxide (Dicup R (trademark), from Hercules Inc.) was injected into the blowing agent stream in 10% by weight solution in methylene chloride. Extruder zone temperatures were maintained at 140°, 180°, and 200° C., respectively. The gel was cooled down to an essentially uniform temperature of about 124° C. The resultant data are given in Table VIII and are illustrated in FIG. 3.

The control LLDPE foam was not satisfactory. Addition of a small amount (0.0054 pph) of dicumyl peroxide improved foam processability and quality. The best result was obtained at a peroxide level of 0.01 pph. Excellent quality foams were produced at a wide range of die gaps. When the peroxide level was raised to 0.0123 pph, symptoms of over-crosslinking developed. At a high peroxide level, the foam strand fractured. Again, a die pressure of approximately 400 psig was the line of demarcation between good and poor foams.

EXAMPLE IX

A Brabender Plasti-corder (trademark of C.W. Brabender Instruments, Inc.) mixing head having 60 ml capacity was employed in this example in order to show that a multi-vinyl functional monomer could be used as a crosslinking agent in accordance with this invention.

The Brabender mixer was heated to an essentially constant temperature of 200° C. A linear low density polyethylene used in Example I was used in all tests of this example. Approximately 40 g of the granular polyethylene was put in the mixer with its blades rotating at a constant speed of 30 rpm. The opening of the mixer was continuously purged with nitrogen in most tests except otherwise specified. The torque was continuously recorded on a strip chart. The torque reached an essentially steady state in 5–10 minutes.

After about 10 minutes mixing, there was added a predetermined amount of crosslinking agent selected from Dicup R dicumyl peroxide by Hercules Inc. and trimethyolpropane triacyrlate (TMPTA) made oy Celanese Chemical Co. Dicup R was fed in 20% solution in methylene chloride. Kneading was continued until the torque peaked out. Melt index of the crosslinked material was determined.

As shown in Table IX, dicumyl peroxide is an effective crosslinking agent. The torque rose about 18% at the peroxide level of 0.02 pph. The level of peroxide was determined rather excessive in Example VIII. A similar increase in torque was achieved by about 0.3 to 0.4 pph TMPTA in nitrogen atmosphere. From this result, it is inferred that a multivinyl monomer may be used as a crosslinking agent for improving extrusion foamability of a linear polyolefin polymer.

EXAMPLE X

The Brabender mixer was also used in this example. Several linear low density polyethylenes and a high density polyethylene having 6.2 melt index (ASTM D-1238-79 Condition E) and 0.963 g/cc density were evaluated for self-crosslinking in air atmosphere. In each test, approximately 40 g of polymer was charged in the mixer with its blades rotating at a constant speed of about 30 rpm. The test data are set forth in Table X.

50/50 by weight mixture of fluorocarbon 12 (FC-12) and methyl chloride (MeCl) for Test No. 1 and a 70/30 by weight mixture of fluorocarbon 12 and fluorocarbon 11 (FC-11) for the other tests. An azido functional silane, 2-(trimethoxysily ethylphenylsulfonyl) azide (C-T2905 distributed by Petrarch Systems, Inc.), was injected to the blowing agent stream at a uniform predetermined rate. The extruder zones were maintained at 170°, 190° and 200° C. for feeding, melting, metering, and mixing zone, respectively. The temperature of the cooling zone was adjusted so that the gel could be cooled down to a uniform temperature for optimum foam expansion.

TABLE VIII

| Test No. | FC-12 Level (pph) (1) | Dicumyl Perox. Level (pph) (2) | Gel Temp. (°C.) (3) | Die Gap (in) (4) | Die Press. (psig) (5) | Extruder Press. (psig) (6) | Foam Thick. (in) (7) | Foam Width (in) (8) | Foam Density (pcf) (9) | Cell Size (mm) (10) | Open Cell (%) (11) | Foam Appear. (12) | Flow Stab. (13) |
|---|---|---|---|---|---|---|---|---|---|---|---|---|---|
| 1 | 19.7 | — | 125 | 0.055 | 390 | 1200 | 0.35 | 0.93 | 1.96 | 0.29 | 13.3 | V | R |
|   |      |   |     | 0.050 | 420 | 1200 | 0.34 | 0.99 | 1.88 | 0.31 | 9.5 | E | R |
|   |      |   |     | 0.045 | 460 | 1260 | 0.30 | 0.97 | 1.76 | 0.28 | 10.0 | E | R |
| 2 | 19.7 | 0.0054 | 124 | 0.070 | 340 | 1240 | 0.48 | 1.08 | 1.80 | 0.41 | 47.4 | V | G |
|   |      |   |     | 0.060 | 370 | 1240 | 0.41 | 0.97 | 1.80 | 0.33 | 14.1 | G | E |
|   |      |   |     | 0.055 | 400 | 1300 | 0.36 | 1.00 | 1.87 | 0.31 | 7.9 | E | E |
| 3 | 19.7 | 0.01 | 123 | 0.080 | 390 | 1340 | 0.58 | 1.10 | 1.67 | 0.44 | 12.8 | E | R |
|   |      |   |     | 0.075 | 410 | 1400 | 0.51 | 1.09 | 1.79 | 0.40 | 11.0 | E | E |
|   |      |   |     | 0.070 | 422 | 1400 | 0.50 | 1.10 | 1.69 | 0.46 | 11.6 | E | E |
|   |      |   |     | 0.060 | 480 | 1460 | 0.43 | 1.14 | 1.69 | 0.43 | 12.7 | E | E |
|   |      |   |     | 0.055 | 525 | 1510 | 0.40 | 1.16 | 1.62 | 0.38 | 13.8 | E | E |
|   |      |   |     | 0.050 | 570 | 1560 | 0.40 | 1.20 | 1.77 | 0.46 | 13.0 | E | E |
| 4 | 19.7 | 0.0123 | 124 | 0.090 | 440 | 1500 | 0.60 | 0.98 | 1.81 | 0.43 | 16.2 | V | R |
|   |      |   |     | 0.080 | 480 | 1540 | 0.57 | 1.06 | 1.66 | 0.38 | 22.0 | G | R |
|   |      |   |     | 0.070 | 620 | 1700 | 0.53 | 1.16 | 1.75 | 0.43 | 32.6 | G | R |
|   |      |   |     | 0.060 | 700 | 1800 | 0.47 | 1.16 | 1.80 | 0.48 | 27.3 | G | R |
| 5 | 19.7 | 0.015 | 124 | 0.125 | 578 | 1680 | 0.87 | 1.07 | 1.93 | 0.85 | 33.8 | — | F |
| 6 | 19.7 | 0.020 | 124 | 0.150 | 480 | 1600 | 0.96 | 1.07 | 1.86 | 0.62 | 35.1 | — | F |

(1) difluorodichloromethane mixed in per hundred parts of polymer
(2) parts of dicumyl peroxide mixed in per hundred parts of polymer
(3) temperature in degrees centigrade to which the gel was cooled down prior to foam expansion
(4) gap of die opening in inches at which samples were taken
(5), (6) pressure in pounds per square inch at the die and at the extruder discharge, respectively
(7), (8) thickness and width of foam body in inches measured in about five minutes after extrusion
(9) density of foam body in pounds per cubic foot measured in about one month
(10) open cell content in percent determined per ASTM D-2856-A
(11) cell size in millimeter in horizontal direction determined per ASTM D-3576
(12) subjective judgment of foam appearance; C = total collapse, PC = partial collapse, O = open cells, B = blips or large voids contained in the foam, V = voids of smaller dimensions contained in the foam, H = hairy skin originating from prefoaming, G = good, E = excellent
(13) the behavior of extrudate; W = wobbly strand, S = surging, R = ripples at the edges, F = melt fracture G = good, E = excellent All linear low density polyethylenes gained more than enough torque for improvement in extrusion foamability during kneading in the mixer. The induction time for torque rise was mostly shorter than 30 minutes. The induction time became shorter and the maximum torque rise was greater at a higher temperature. In inert atmosphere, the torque did not rise appreciably. Antioxidant delayed crosslinking but did not stop its development. From the results of the tests, it is inferred that melt kneading of a linear polyethylene in the presence of oxygen is another way of lightly crosslinking the polymer for extrusion foaming. A vented extruder could be used for this purpose.

EXAMPLE XI

The apparatus used in this example was the same as Example 1. A granular polystyrene, polystyrene with a weight average molecular weight of about 200,000, was uniformly mixed with a small amount of dibutyl tin dilaurate condensation catalyst (T-12, available from M & T Chemicals, Inc.), barium stearate and talcum powder. The mixture was into the extruder at an essentially uniform rate bout 10 pounds per hour. A premixed blowing agent injected into the extruder at a predetermined rate. Blowing agents used in this example were a

TABLE IX

| Test No. (1) | Crosslinking Agent Type (1) | Level (pph) (2) | Environment Gas (3) | Peak Time (min) (4) | Torque Ratio (Peak/Initial) (5) | Melt Index (dg/min) (6) |
|---|---|---|---|---|---|---|
| 1 | — | — | $N_2$ | 20 | 1.00 | 7.19 |
| 2 | Dicup R | 0.01 | $N_2$ | 12 | 1.03 | 5.94 |
|   |         | 0.02 | $N_2$ | 12 | 1.18 | 4.50 |
|   |         | 0.03 | $N_2$ | 14 | 1.28 | 2.62 |
|   |         | 0.04 | $N_2$ | 12 | 1.37 | 2.32 |
|   |         | 0.05 | $N_2$ | 14 | 1.47 | 1.76 |
|   |         | 0.06 | $N_2$ | 14 | 1.59 | 1.07 |
|   |         | 0.08 | $N_2$ | 12 | 1.81 | 0.93 |
|   |         | 0.10 | $N_2$ | 12 | 2.06 | 0.24 |
| 3 | TMPTA | 0.1 | $N_2$ | 12 | 1.01 | 5.77 |
|   |       | 0.15 | $N_2$ | 20 | 1.08 | 5.29 |
|   |       | 0.2 | $N_2$ | 30 | 1.07 | 4.73 |
|   |       | 0.3 | $N_2$ | 25 | 1.15 | 2.73 |
|   |       | 0.4 | $N_2$ | 27 | 1.19 | 2.54 |
|   |       | 0.5 | $N_2$ | 14 | 2.29 | 1.17 |

TABLE IX-continued

| Test No. (1) | Crosslinking Agent Type (1) | Level (pph) (2) | Environment Gas (3) | Peak Time (min) (4) | Torque Ratio (Peak/ Initial) (5) | Melt Index (dg/min) (6) |
|---|---|---|---|---|---|---|
| | | 0.5 | Air | 20 | 1.98 | ND |

ND = not determined
(1) Dicup R = dicumyl peroxide manufactured by Hercules, Inc. TMPTA = trimethyolpropane triacrylate made by Celanese Chemical Co.
(2) parts of crosslinking agent mixed in per hundred parts of polymer
(3) $N_2$ = The opening of Brabender mixer was blanketed nitrogen Air = No nitrogen blanketing
(4) time from the start of a test to when the torque reached the maximum
(5) the maximum torque divided by the torque immediately before the crosslinking agent was added
(6) melt index of the kneaded polymer determined per ASTM D-1238-79 condition N

TABLE X

| Test No. (1) | Polymer Type (1) | Antioxidant Level (ppm) (2) | Temp. (°C.) (3) | Environment Gas (4) | Induction Time (min) (5) | Peak Time (min) (6) | Torque Ratio (Peak/ Minimum) (7) |
|---|---|---|---|---|---|---|---|
| 1 | LLDPE | — | 180 | Air | 12 | 44 | 1.22 |
| | | — | 200 | Air | 6 | 68 | 1.56 |
| | | — | 225 | Air | 5 | 33 | 1.99 |
| | | — | 200 | $N_2$ | 12 | 20 | 1.05 |
| | | 300 | 200 | Air | 6 | 56 | 1.65 |
| | | 500 | 200 | Air | 20 | 74 | 1.56 |
| | | 800 | 200 | Air | 28 | 74 | 1.63 |
| 2 | DOWLEX 2045 | — | 200 | Air | 26 | 60 | 1.23 |
| 3 | DOWLEX 2042 | — | 200 | Air | 30 | 66 | 1.30 |
| 4 | DOWLEX 2032 | — | 200 | Air | 24 | 74 | 1.56 |
| 5 | HDPE | — | 200 | Air | 12 | 20 | 1.04 |

(1) LLDPE = Linear low density polyethylene (1.0 melt index, 0.935 g/cc density) DOWLEX 2045, 2042 and 2032 = Dow linear low density polyethylene HDPE = High density polyethylene (6.2 melt index, 0.965 g/cc density)
(2) parts of Ciba-Geigy Chemical Co. Irganox 1010 antioxidant mixed in per million parts of polymer
(3) temperature of the Brabender bowl maintained in degrees centigrade
(4) $N_2$ = The opening of the mixer was blanketed with nitrogen Air = No nitrogen blanketing
(5) time in minutes from the start of the test to the threshold of torque increase
(6) time in minutes from the start of the test to the point when the torque read the maximum
(7) the maximum torque divided by the minimum torque At a fixed die opening for a given blowing agent system where all formulations provided good quality foams, both pressures at the die and extruder discharge were recorded and samples were taken. The foam samples were aged for about one month at ambient temperature prior to property determination and secondary foaming tests.

Secondary foaming was conducted both by atmospheric steam and by hot air. Foam slugs of about 0.25" thickness were slided out of foam strands and aged for about one day at ambient temperature prior to secondary expansions. After exposure to atmospheric steam for varying lengths of time, foam specimens were aged at ambient temperature while their weights and volumes were monitored. Highly expanded foam specimens shrank when taken out of steam but recovered to the final steady state volumes in about two days. Expansion tests in hot air were conducted similarly with the exception that expansion or shrinkage of a foam specimen in the oven was permanent not needing ambient aging for volume recovery.

Table XIA shows that incorporation of an azido functional silane gradually raises both the die pressure and the extruder discharge pressure. Other noticable effects of silane include enlargement in cell size and cross sectional size which are desirable in foam extrusion.

The remarkable effect of silane on steam expandability of extruded polystyrene foam is seen in Table XIB. Addition of silane enhances both the rate and extent of foam expansion in steam. At the silane level of 0.2 pph, the foam expands about twice as much as the control to an expansion ratio exceeding 280 in two hours. At this long exposure to steam, the control and one with a low level (0.05 pph) of silane suffered thermal collapse; the expansion ratios are lower than those at one hour exposure.

The type of blowing agent also has a significant effect on steam expandability of the extruded polystyrene foams. The foam expanded with FC-12/MeCl blowing agent shows expansions lower than one half of that made with FC-12/FC-11 blowing agent. Loss of methyl chloride during aging is one probable cause of the relatively poorer performance of the FC-12/MeCl blown foam. FC-11, having a high solubility in polystyrene, effectively plasticizes polystyrene for faster and greater expansion.

The effect of crosslinking is also seen in hot air expansion tests. As Table XIC shows, foams lightly crosslinked with an azido functional silane expand more and withstand hot air longer than the control. For example, a foam crosslinked with 0.15 pph or higher level of azido silane keeps expanding during 90 minutes exposure to 100° C. air while the control collapses within 60 minutes at the same temperature. Although less pronounced, the crosslinking effect persists at a lower level of silane as well.

EXAMPLE XII

The apparatus and its operating procedure used for tests in this example are the same as in Example 1. The polymer feedstock employed for tests in this example was a 50/50 by weight blend of polystyrene with Mw 200,000 and polystyrene with Mw 300,000. Approximately 0.05 pph T-12, 0.1 pph barium stearate and 0.1 pph talcum powder were mixed in the granular blend of two polystyrenes and fed into the extruder at a uniform rate of 10 pounds per hour. In test 1, there was used a 50/50 by weight mixture of FC-12 and methyl chloride as the expanding agent and a 70/30 mixture of FC-12 and FC-11 in the rest of the tests.

TABLE XIa

| Test No. | Blowing Agent Type (1) | Ratio (2) | Level (3) | BaSt Level (4) | Talc Level (5) | T-12 Level (6) | Azido Silane Level (7) | Foaming Gel Temp. (8) | Die Gap (9) | Die Press. (10) | Extruder Press. (11) | Foam Thick. (12) | Foam Width (13) | Foam Density (14) | Cell Size (15) |
|---|---|---|---|---|---|---|---|---|---|---|---|---|---|---|---|
| 1 | FC-12/MeCl | 50/50 | 12.4 | 0.1 | 0.2 | 0.05 | — | 120 | 0.089 | 540 | 1000 | 0.83 | 0.94 | 2.18 | 0.25 |
| 2 | FC-12/FC-11 | 70/30 | 15.4 | 0.05 | 0.1 | 0.025 | — | 135 | 0.036 | 660 | 1100 | 0.67 | 1.01 | 2.12 | 0.16 |
| 3 | FC-12/FC-11 | 70/30 | 15.4 | 0.05 | 0.1 | 0.025 | 0.05 | 134.5 | 0.036 | 565 | 1000 | 0.65 | 1.07 | 2.06 | 0.27 |
| 4 | FC-12/FC-11 | 70/30 | 15.4 | 0.05 | 0.1 | 0.025 | 0.1 | 134 | 0.036 | 640 | 1110 | 0.88 | 1.20 | 2.20 | 0.22 |
| 5 | FC-12/FC-11 | 70/30 | 15.4 | 0.05 | 0.1 | 0.025 | 0.15 | 134 | 0.036 | 660 | 1150 | 0.90 | 1.28 | 2.24 | 0.27 |
| 6 | FC-12/FC-11 | 70/30 | 15.4 | 0.05 | 0.1 | 0.025 | 0.2 | 134 | 0.036 | 690 | 1200 | 0.73 | 1.29 | 2.25 | 0.27 |
| 7 | FC-12/FC-11 | 70/30 | 15.4 | 0.05 | 0.1 | 0.025 | 0.25 | 134 | 0.036 | 730 | 1300 | 0.98 | 1.43 | 2.28 | 0.21 |

(1) = FC-12 = dichlorodifluoromethane, FC-11 = trichloromonofluoromethane, MeCl = methyl chloride
(2) = mixture ratio by weight of the component blowing agents
(3) = parts of blowing agent mixed in per hundred parts of polymer
(4) = parts of barium stearate mixed in per hundred parts of polymer
(5) = parts of talcum powder mixed in per hundred parts of polymer
(6) = parts of dibutyl tin dilaurate mixed in per hundred parts of polymer
(7) = parts of azido functional silane mixed in per hundred parts of polymer
(8) = temperature of foaming gel in degrees centigrade
(9) = the gap of die opening in inches
(10) = the pressure in pounds per square inch at the die
(11) = the pressure in pounds per square inch at the extruder discharge
(12) = thickness of foam body in inches determined after aging for about a month
(13) = width of foam body in inches determined after aging for about a month
(14) = density of foam body in pounds per cubic foot determined after aging for about a month
(15) = cell size in millimeter in horizontal direction determined per ASTM D-3576

TABLE XIb

| Test No. | Blowing Agent Type (1) | Ratio (2) | Level (3) | Azido Silane Level (4) | Initial Expansion Ratio (5) | 15 sec. | 30 sec. | 1 min. | 3 min. | 5 min. | 7 min. | 10 min. | 15 min. | 20 min. | 30 min. | 1 hr. | 2 hrs. |
|---|---|---|---|---|---|---|---|---|---|---|---|---|---|---|---|---|---|
| 1 | FC-12/MeCl | 50/50 | 12.4 | — | 24.8 | 32.0 | 41.2 | 50.4 | 55.5 | 53.7 | 58.0 | 57.5 | 57.0 | 58.0 | 58.0 | 58.5 | 65.5 |
| 2 | FC-12/FC-11 | 70/30 | 15.4 | — | 24.6 | 39.0 | 57.6 | 81.2 | 107 | 124 | 129 | 140 | 147 | 140 | 151 | 145 | 94 |
| 3 | FC-12/FC-11 | 70/30 | 15.4 | 0.05 | 22.5 | 66.6 | 76.3 | 105 | 136 | 159 | 170 | 170 | 181 | 189 | 185 | 190 | 132 |
| 4 | FC-12/FC-11 | 70/30 | 15.4 | 0.1 | 24.0 | 44.2 | 66.0 | 98.6 | 137 | 150 | 166 | 175 | 193 | 198 | 218 | 237 | 246 |
| 5 | FC-12/FC-11 | 70/30 | 15.4 | 0.15 | 23.7 | 51.7 | 69.7 | 102 | 138 | 154 | 168 | 175 | 187 | 197 | 218 | 252 | 218 |
| 6 | FC-12/FC-11 | 70/30 | 15.4 | 0.2 | 25.9 | 57.3 | 71.0 | 108 | 149 | 179 | 187 | 212 | 217 | 227 | 251 | 266 | 288 |
| 7 | FC-12/FC-11 | 70/30 | 15.4 | 0.25 | 23.4 | 63.8 | 82.1 | 109 | 136 | 162 | 173 | 155 | 183 | 186 | 186 | 161 | 172 |

(1) = FC-12 = dichlorodifluoromethane, FC-11 = trichloromonofluoromethane, MeCl = methyl chloride
(2) = mixture ratio by weight of the component blowing agents
(3) = parts of blowing agent mixed in per hundred parts of polymer
(4) = parts of azido functional silane mixed in per hundred parts of polymer
(5) = specific volume of foam body aged for about a month divided by specific volume of the polymer determined prior to steam expansion tests
(6) = expansion ratio of foam body determined in about two days after expansion in steam for given period of time

TABLE XIc

| Test No. | Blowing Agent Type (1) | Ratio (2) | Level (3) | Azido Silane Level (4) | Initial Expansion Ratio (5) | 3 | 5 | 10 | 15 | 30 | 45 | 60 | 90 |
|---|---|---|---|---|---|---|---|---|---|---|---|---|---|
| | | | | | | \multicolumn{8}{c}{Expansion Ratio after Expanding in Hot Air at 100° C. for (min.) (6)} |
| 2 | FC-12/FC-11 | 70/30 | 15.4 | — | 24.6 | 29.2 | 47.8 | 68.3 | 59.5 | 68.8 | 54.8 | 12.8 | 14.0 |
| 3 | FC-12/FC-11 | 70/30 | 15.4 | 0.05 | 22.5 | 27.6 | 28.4 | 68.3 | 57.2 | 75.8 | 79.8 | 36.2 | 31.5 |
| 4 | FC-12/FC-11 | 70/30 | 15.4 | 0.1 | 24.0 | 26.7 | 41.1 | 56.3 | 56.3 | 78.3 | 87.2 | 39.9 | 51.5 |
| 5 | FC-12/FC-11 | 70/30 | 15.4 | 0.15 | 23.7 | 26.7 | 36.3 | 49.6 | 66.2 | 75.6 | 86.1 | 50.4 | 85.1 |
| 6 | FC-12/FC-11 | 70/30 | 15.4 | 0.2 | 25.9 | 26.7 | 43.0 | 53.4 | 64.0 | 71.8 | 84.0 | 97.4 | 120.3 |
| 7 | FC-12/FC-11 | 70/30 | 15.4 | 0.25 | 23.4 | 28.6 | 50.6 | 55.7 | 58.2 | 74.6 | 88.2 | 95.5 | 106.0 |

| Test No. | Blowing Agent Type (1) | Ratio (2) | Level (3) | Azido Silane Level (4) | Initial Expansion Ratio (5) | 3 | 5 | 10 | 15 | 30 | 45 | 60 | 90 |
|---|---|---|---|---|---|---|---|---|---|---|---|---|---|
| | | | | | | \multicolumn{8}{c}{Expansion Ratio after Expanding in Hot Air at 115° C. for (min.) (7)} |
| 2 | FC-12/FC-11 | 70/30 | 15.4 | — | 24.6 | 29.2 | 39.4 | 57.2 | 65.6 | 30.2 | 9.6 | 7.9 | 7.4 |
| 3 | FC-12/FC-11 | 70/30 | 15.4 | 0.05 | 22.5 | 35.0 | 38.5 | 61.8 | 57.8 | 48.3 | 11.6 | 8.4 | 6.4 |
| 4 | FC-12/FC-11 | 70/30 | 15.4 | 0.1 | 24.0 | 27.3 | 47.7 | 66.2 | 51.6 | 77.8 | 16.2 | 11.6 | 8.4 |
| 5 | FC-12/FC-11 | 70/30 | 15.4 | 0.15 | 23.7 | 27.3 | 44.1 | 58.2 | 63.0 | 72.6 | 13.7 | 10.1 | 7.6 |
| 6 | FC-12/FC-11 | 70/30 | 15.4 | 0.2 | 25.9 | 38.2 | 42.0 | 61.3 | 63.0 | 91.4 | 25.8 | 14.3 | 11.5 |

TABLE XIc-continued

| 7 | FC-12/FC-11 | 70/30 | 15.4 | 0.25 | 23.4 | 25.8 | 40.1 | 66.2 | 59.2 | 83.0 | 48.3 | 16.8 | 11.6 |

(1) = FC-12 = dichlorodifluoromethane, FC-11 = trichloromonofluoromethane
(2) = mixture ratio by weight of the component blowing agents
(3) = parts of blowing agent mixed in per hundred parts of polymer
(4) = parts of azido functional silane mixed in per hundred parts of polymer
(5) = specific volume of foam body aged for about a month divided by specific volume of the polymer determined prior to steam expansion tests
(6) = expansion ratio of foam body after expanding in hot air of 110° C. for specified period
(7) = expansion ratio of foam body after expanding in hot air of 115° C. for specified period The level of azido silane crosslinking agent was varied up to 0.45 pph. The extruder zones were maintained at about 170°, 200° and 200° C. for feeding, melting, metering, and mixing zone, respectively. The temperature of the cooling zone was adjusted so that the gel could reach an essentially uniform temperature of about 135° C.

When the operating condition reached an essentially steady state, the effects of die opening on foam appearance and line pressure were studied. Foam samples were taken both at the threshold die gap for prefoaming and at a fixed die gap for a given blowing agent system.

Property determination and secondary foaming tests were conducted as described in Example XI.

In general, silane crosslinking has a similar effect on this polymer blend. As shown in Tables XIIA, XIIB and XIIC, azido functional silane increased die pressure and cell size permitting achievement of a larger foam cross section and greater expansion in both steam and hot air. The die may be opened wider at an azido functional silane level 0.25 pph or higher. For this polymer blend also, the type of expanding agent has a pronounced effect on steam expandability. FC-12/FC-11 is superior to FC-12/MeCl blowing agent. This is ascribed to the low permeability and high solubility of FC-11 in polystyrene.

TABLE XIIa

| | Blowing Agent | | | Azido Silane | Foaming Gel | Threshold for Prefoaming | | | |
|---|---|---|---|---|---|---|---|---|---|
| Test No. | Type (1) | Ratio (2) | Level (3) | Level (4) | Temp. (5) | Die Gap (6) | Die Press. (7) | Foam Thick. (8) | Foam Width (9) |
| 1 | FC-12/MeCl | 50/50 | 11.9 | — | 135 | 0.080 | 420 | 0.74 | 1.13 |
| 2 | FC-12/FC-11 | 70/30 | 15.4 | — | 135 | 0.071 | 615 | 0.62 | 1.17 |
| 3 | FC-12/FC-11 | 70/30 | 15.4 | 0.05 | 135 | 0.080 | 605 | 0.70 | 1.20 |
| 4 | FC-12/FC-11 | 70/30 | 15.4 | 0.1 | 135 | 0.080 | 630 | 0.68 | 1.27 |
| 5 | FC-12/FC-11 | 70/30 | 15.4 | 0.15 | 135 | 0.080 | 650 | 0.79 | 1.34 |
| 6 | FC-12/FC-11 | 70/30 | 15.4 | 0.2 | 135 | 0.080 | 670 | 0.79 | 1.31 |
| 7 | FC-12/FC-11 | 70/30 | 15.4 | 0.25 | 135 | 0.089 | 610 | 0.80 | 1.30 |
| 8 | FC-12/FC-11 | 70/30 | 15.4 | 0.35 | 135 | 0.098 | 590 | 1.11 | 1.52 |
| 9 | FC-12/FC-11 | 70/30 | 15.4 | 0.45 | 135 | 0.098 | 590 | 0.97 | 1.32 |

| Test No. | Sampling Die Gap (10) | Die Press. (11) | Extruder Press. (12) | Foam Thick. (13) | Foam Width (14) | Foam Density (15) | Cell Size (16) |
|---|---|---|---|---|---|---|---|
| 1 | 0.071 | 490 | 950 | 0.67 | 1.11 | 2.09 | 0.45 |
| 2 | 0.071 | 615 | 1200 | 0.62 | 1.17 | 2.10 | 0.30 |
|   | 0.080 | 510 | 1110 | 0.65 | 1.08 | 2.29 | — |
| 3 | 0.080 | 605 | 1300 | 0.70 | 1.20 | 2.34 | 0.31 |
| 4 | 0.080 | 630 | 1340 | 0.68 | 1.27 | 2.38 | 0.35 |
| 5 | 0.080 | 650 | 1350 | 0.79 | 1.34 | 2.35 | 0.38 |
| 6 | 0.080 | 670 | 1370 | 0.79 | 1.31 | 2.34 | 0.43 |
| 7 | 0.080 | 705 | 1350 | 0.82 | 1.35 | 2.20 | 0.42 |
| 8 | 0.080 | 770 | 1450 | 1.03 | 1.44 | 2.24 | 0.56 |
| 9 | 0.080 | 810 | 1475 | 0.88 | 1.39 | 2.06 | 0.42 |

(1) = FC-12 = dichlorodifluoromethane, FC-11 = trichloromonofluoromethane, MeCl = methyl chloride
(2) = mixture ratio by weight of the component blowing agents
(3) = parts of blowing agent mixed in per hundred parts of polymer
(4) = parts of azido functional silane mixed in per hundred parts of polymer
(5) = temperature of foaming gel in degrees centigrade
(6) = the gap of die opening in inches at the threshold of prefoaming
(7) = pressure at the die in pounds per square inch at the threshold of prefoaming
(8) = thickness of foam body in inches at the threshold of prefoaming
(9) = width of foam body in inches at the threshold of prefoaming
(10) = the gap of die opening in inches where the foam sample was taken
(11) = pressure at the die in pounds per square inch at the sampling die opening
(12) = pressure at the extruder discharge in pounds per square inch at the sampling die opening
(13) = thickness of foam body in inches determined after aging for about a month
(14) = width of foam body in inches determined after aging for about a month
(15) = density of foam body in pounds per cubic foot determined after aging for about a month
(16) = cell size in millimeter in horizontal direction determined per ASTM D-3576.

TABLE XIIb

| | Blowing Agent | | Azido Silane | Initial Expansion | (6) Expansion Ratio after Expanding In Steam for | | | | |
|---|---|---|---|---|---|---|---|---|---|
| Test No. | Type (1) | Ratio (2) | Level (3) | Level (4) | Ratio (5) | 15 sec. | 30 sec. | 1 min. | 3 min. | 5 min. |

TABLE XIIb-continued

| | | | | | | | | | | |
|---|---|---|---|---|---|---|---|---|---|---|
| 1 | FC-12/MeCl | 50/50 | 11.9 | — | 27.6 | 39.4 | 46.3 | 59.0 | 59.0 | 57.8 |
| 2 | FC-12/FC-11 | 70/30 | 15.4 | — | 25.7 | 35.7 | 63.2 | 80.8 | 99.1 | 105 |
| 3 | FC-12/FC-11 | 70/30 | 15.4 | 0.05 | 24.6 | 33.2 | 60.2 | 81.4 | 101 | 110 |
| 4 | FC-12/FC-11 | 70/30 | 15.4 | 0.1 | 24.4 | 34.3 | 62.0 | 82.0 | 105 | 113 |
| 5 | FC-12/FC-11 | 70/30 | 15.4 | 0.15 | 24.6 | 30.7 | 63.8 | 86.2 | 114 | 127 |
| 6 | FC-12/FC-11 | 70/30 | 15.4 | 0.2 | 25.4 | 37.1 | 71.1 | 92.9 | 120 | 135 |
| 7 | FC-12/FC-11 | 70/30 | 15.4 | 0.25 | 26.7 | 38.9 | 66.5 | 95.8 | 128 | 143 |
| 8 | FC-12/FC-11 | 70/30 | 15.4 | 0.35 | 26.4 | 41.3 | 76.4 | 103 | 144 | 164 |
| 9 | FC-12/FC-11 | 70/30 | 15.4 | 0.45 | 27.7 | 41.3 | 81.7 | 99.2 | 129 | 143 |

(6) Expansion Ratio after Expanding In Steam for

| Test No. | 7 min. | 10 min. | 12 min. | 15 min. | 20 min. | 30 min. | 45 min. | 1 hr. | 2 hrs. |
|---|---|---|---|---|---|---|---|---|---|
| 1 | 58.7 | 59.0 | 57.7 | 58.7 | 60.8 | 57.6 | 53.4 | 52.1 | 48.3 |
| 2 | 108 | 114 | 113 | 117 | 126 | 127 | 130 | 116 | 103 |
| 3 | 109 | 121 | 112 | 129 | 136 | 138 | 157 | 143 | 119 |
| 4 | 119 | 119 | 126 | 133 | 130 | 139 | 124 | 131 | 117 |
| 5 | 131 | 142 | 141 | 145 | 160 | 166 | 159 | 168 | 150 |
| 6 | 134 | 154 | 157 | 169 | 175 | 176 | 160 | 170 | 176 |
| 7 | 152 | 157 | 167 | 198 | 187 | 190 | 202 | 190 | 169 |
| 8 | 178 | 201 | 202 | 202 | 203 | 220 | 185 | 165 | 170 |
| 9 | 160 | 177 | 179 | 173 | 176 | 187 | 199 | 176 | 167 |

(1) = FC-12 = dichlorodifluoromethane, FC-11 = trichloromonofluoromethane, MeCl = methyl chloride
(2) = mixture ratio by weight of the component blowing agents
(3) = parts of blowing agent mixed in per hundred parts of polymer
(4) = parts of azido functional silane mixed in per hundred parts of polymer
(5) = specific volume of foam body aged for about a month divided by specific volume of the polymer determined prior to steam expansion tests
(6) = expansion ratio of foam body determined in about two days after expansion in steam for given period of time

TABLE XIIC

| Test No. | Blowing Agent Type (1) | Blowing Agent Ratio (2) | Blowing Agent Level (3) | Azido Silane Level (4) | Initial Expansion Ratio (5) | Expansion Ratio after Expanding in Hot Air at 115° C. for (min.) (6) | | | | | | | |
|---|---|---|---|---|---|---|---|---|---|---|---|---|---|
| | | | | | | 3 | 5 | 10 | 15 | 30 | 45 | 60 | 90 |
| 2 | FC-12/FC-11 | 70/30 | 15.4 | — | 29.0 | 56.6 | 61.9 | 55.7 | 38.2 | 18.1 | 8.6 | 7.0 | 6.4 |
| 3 | FC-12/FC-11 | 70/30 | 15.4 | 0.05 | 26.9 | 54.2 | 57.1 | 59.2 | 56.5 | 29.0 | 16.4 | 10.6 | 8.4 |
| 4 | FC-12/FC-11 | 70/30 | 15.4 | 0.1 | 26.3 | 53.7 | 54.1 | 62.2 | 57.6 | 44.0 | 17.7 | 15.6 | 10.0 |
| 5 | FC-12/FC-11 | 70/30 | 15.4 | 0.15 | 26.5 | 54.7 | 54.4 | 61.8 | 58.9 | 56.8 | 51.5 | 17.9 | 13.2 |
| 6 | FC-12/FC-11 | 70/30 | 15.4 | 0.2 | 27.6 | 58.0 | 57.5 | 61.7 | 65.2 | 69.2 | 49.8 | 14.6 | 13.8 |
| 7 | FC-12/FC-11 | 70/30 | 15.4 | 0.25 | 28.6 | 59.2 | 61.3 | 59.8 | 65.0 | 72.7 | 70.3 | 26.3 | 15.3 |
| 8 | FC-12/FC-11 | 70/30 | 15.4 | 0.35 | 28.2 | 56.1 | 58.3 | 57.3 | 65.3 | 69.9 | 72.4 | 77.1 | 42.1 |
| 9 | FC-12/FC-11 | 70/30 | 15.4 | 0.45 | 29.8 | 56.2 | 65.8 | 60.1 | 71.2 | 70.5 | 66.5 | 33.7 | 16.6 |

(1) = FC-12 = dichlorodifluoromethane, FC-11 = trichloromonofluoromethane
(2) = mixture ratio by weight of the component blowing agents
(3) = parts of blowing agent mixed in per hundred parts of polymer
(4) = parts of azido functional silane mixed in per hundred parts of polymer
(5) = specific volume of foam body aged for about a month divided by specific volume of the polymer determined prior to steam expansion tests
(6) = expansion ratio of foam body after expanding in hot air of 115° C. for specified period

EXAMPLE XIII

The apparatus used in this example was the same as used in the other examples of this invention. An "S" shaped die orifice for Dow Pelaspan-Pac loose-fill packing was attached at the discharge end of the extruder replacing the gap-adjustable die used in the other examples.

A 60/40 by weight mixture of Polystyrene with Mw 200,000 and polystyrene with Mw 300,000 was mixed with 1.2 pph fire retardant made by Dow Chemical Co. (FR-651), 0.02 pph magnesium oxide and 0.02 pph calcium stearate by the use of a small amount of wetting agent. For tests incorporating azido silane, a small amount of (0.05 pph) of dibutyl tin dilaurate (T-12) was additionally mixed in. The mixture was fed into the extruder at a uniform rate of about 10 pounds per hour. A predetermined amount of azido functional silane was premixed in the blowing agent and injected into the extruder. A 95/5 by weight mixture of FC-11 and methylene chloride was the blowing agent used for Tests 1 and 2 and a small amount of methanol was mixed to the blowing agent for Test 3. The extruder zones were maintained at 160°, 180° and 200° C. for feeding, melting and metering, and mixing zone, respectively. The temperature of the cooling zone was adjusted so that the extruder strand could become essentially free of voids upon quenching in cold water. The solid strand was cut to granules of approximately ¼" in length. The granules were about 5/16" in width and about 3/32" in thickness.

The as-extruded granules were annealed in 65° C. water for about 30 minutes and aged in ambient air for one day prior to steam expansion tests. The granules were expanded by atmospheric steam for 10 minutes and then aged for a day. This first expansion was followed by the second, third and fourth expansion in a day interval between the expansions. Expansion times were 10, 1 and 1 minutes for the second, third and fourth expansion, respectively. Foam densities were determined after the foams were aged for one day after each expansion.

As shown in Table XIII, addition of an azido silane results in a slight increase in the line pressure and leads to lower foam densities. The expanded material crosslinked with azido silane not only showed lower densities after each expansion but better appearance after third and fourth expansions. The control (Test 1) developed splits and cracks on the surface but the crosslinked materials showed few such deficiencies.

EXAMPLE XIV

Figure 5:
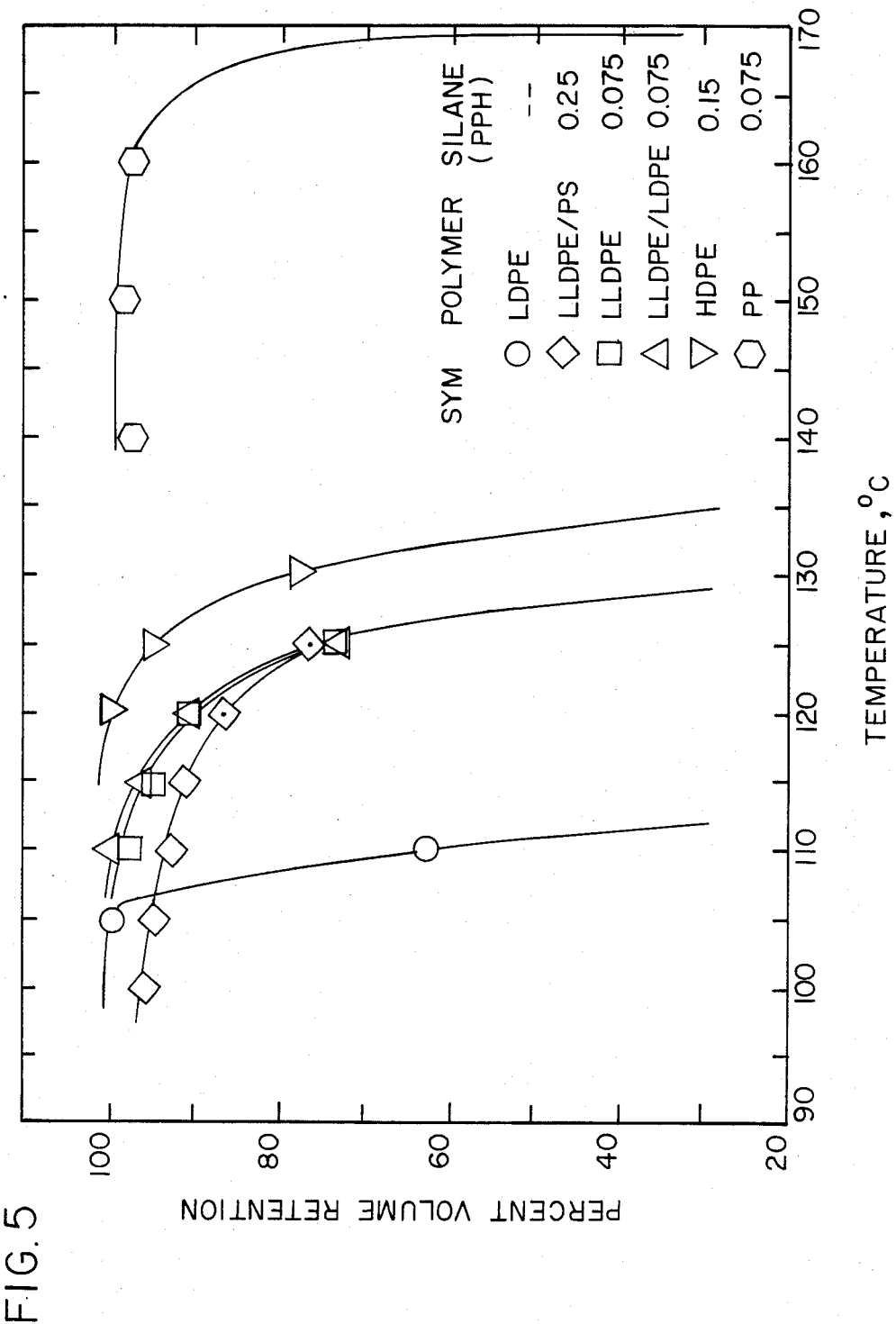
FIG. 5 is a graph of heat distortion characteristics (percent volume retention versus temperature) for a series of linear olefinic polymer foams crosslinked with an azido silane.

The heat distortion temperature of foams was tested by aging them in a convective oven for one hour. FIG. 5 illustrates the results of the tests. A control branched low density polyethylene (LDPE) foam with no azido silane crosslinking showed substantial heat distortion at between 105° C. and 110° C. The heat distortion temperatures of foams produced from polypropylene (PP) high density polyethlyene (HDPE), and linear low density polyethylene (LLDPE) are about 165° C., 125° C., and 115° C., respectively.

higher density (2.53 pcf) LDPE foam in compressive strength and actually outperformed the LDPE foam in tensile properties. The heat distortion temperature of the LLDPE foams were 10°-15° C. higher than that of the LDPE foam.

Foams made from high density polyethylene and polypropylene also reflect superior compressive strengths and heat distortion temperatures in comparison to the LDPE foam.

TABLE XV

| Polymer Type (1) | Aged Foam Density (pcf) | Open Cell (%) | Compressive Strength at Deflection of | | | | Tensile Properties | | | Heat Distortion Temp. (°C.) (4) |
|---|---|---|---|---|---|---|---|---|---|---|
| | | | 5% (psi) | 10% (psi) | 25% (psi) | 50% (psi) | Strength (psi) | Elong. (%) | Toughness (psi) | |
| | | | (2) | | | | | (3) | | |
| LDPE | 2.53 | 10 | 5.0 | 8.3 | 11.2 | 20.0 | 45 | 53 | 12 | 100 |
| LDPE | 1.64 | 10 | 2.2 | 3.6 | 6.3 | 14.1 | 35 | 47 | 8 | 100 |
| LLDPE | 1.64 | 21 | 5.1 | 7.0 | 9.6 | 18.7 | 59 | 60 | 18 | 115 |
| LLDPE/PS:80/20 | 1.42 | 11 | 5.1 | 6.8 | 9.3 | 17.6 | 39 | 22 | 4 | 110 |
| LLDPE/LDPE:60/40 | 1.84 | 25 | 1.6 | 3.1 | 5.9 | 12.9 | 30 | 58 | 9 | 115 |
| HDPE | 1.45 | 25 | 6.2 | 9.4 | 9.9 | 13.1 | 42 | 38 | 8 | 125 |
| PP | 1.51 | 14 | 4.3 | 8.1 | 10.9 | 12.3 | 47 | 50 | 12 | 165 |

(1) = LDPE foams used for comparison were made from a low density polyethylene having 2.3 melt index and 0.923 g/cc density
(2) = average of three directions
(3) = toughness = (tensile strength) (elongation)/2
(4) = the highest temperature at which the foam shrinks no more than 5% in volume

TABLE XIII

| Test No. | BA Level (1) | Azido Silane Level (2) | MeOH Level (3) | T-12 Level (4) | Gel Temp. (5) | Extruder Press. (6) | Die Press. (7) | Foam Density After Expansion (8) | | | |
|---|---|---|---|---|---|---|---|---|---|---|---|
| | | | | | | | | 1st | 2nd | 3rd | 4th |
| 1 | 1.44 | — | — | — | 138 | 1700 | 580 | 1.58 | 0.92 | 0.63 | 0.68 |
| 2 | 1.42 | 0.1 | — | 0.05 | 138 | 1820 | 650 | 1.38 | 0.75 | 0.55 | 0.48 |
| 3 | 1.34 | 0.15 | 0.7 | 0.05 | 140 | 1900 | 780 | 1.34 | 0.85 | 0.60 | 0.55 |

(1) = parts of 95/5 by weight mixture of FC-11/methylene chloride mixed in per hundred parts of polymer
(2) = parts of azido functional silane mixed in per hundred parts of polymer
(3) = parts of methanol mixed in per hundred parts of polymer
(4) = parts of dibutyl tin dilaurate (T-12) mixed in per hundred parts of polymer
(5) = the temperature of the extruder coming out of the die orifice in degrees centigrade
(6) = pressure at the extruder discharge in pounds per square inch
(7) = pressure at the die in pounds per square inch
(8) = density of foam body in pounds per cubic foot for foams aged for one day after expansion. Foams were exposed to atmospheric stream for 10, 10, 1 and 1 minutes for the first, second, third, and fourth expansion, respectively. Foams were aged approximately 24 hours between expansions.

Blending in 20% polystyrene (PS) slightly reduces the heat distortion temperature of linear low density polyethylene. On the other hand, incorporating as much as 40% LDPE does not cause a drop in the heat distortion temperature of the linear low density polyethylene. All of the linear olefinic polymer foams crosslinked with azido silanes would be serviceable at temperature higher than that with a branched low density polyethylene foam.

EXAMPLE XV

Figure 6:
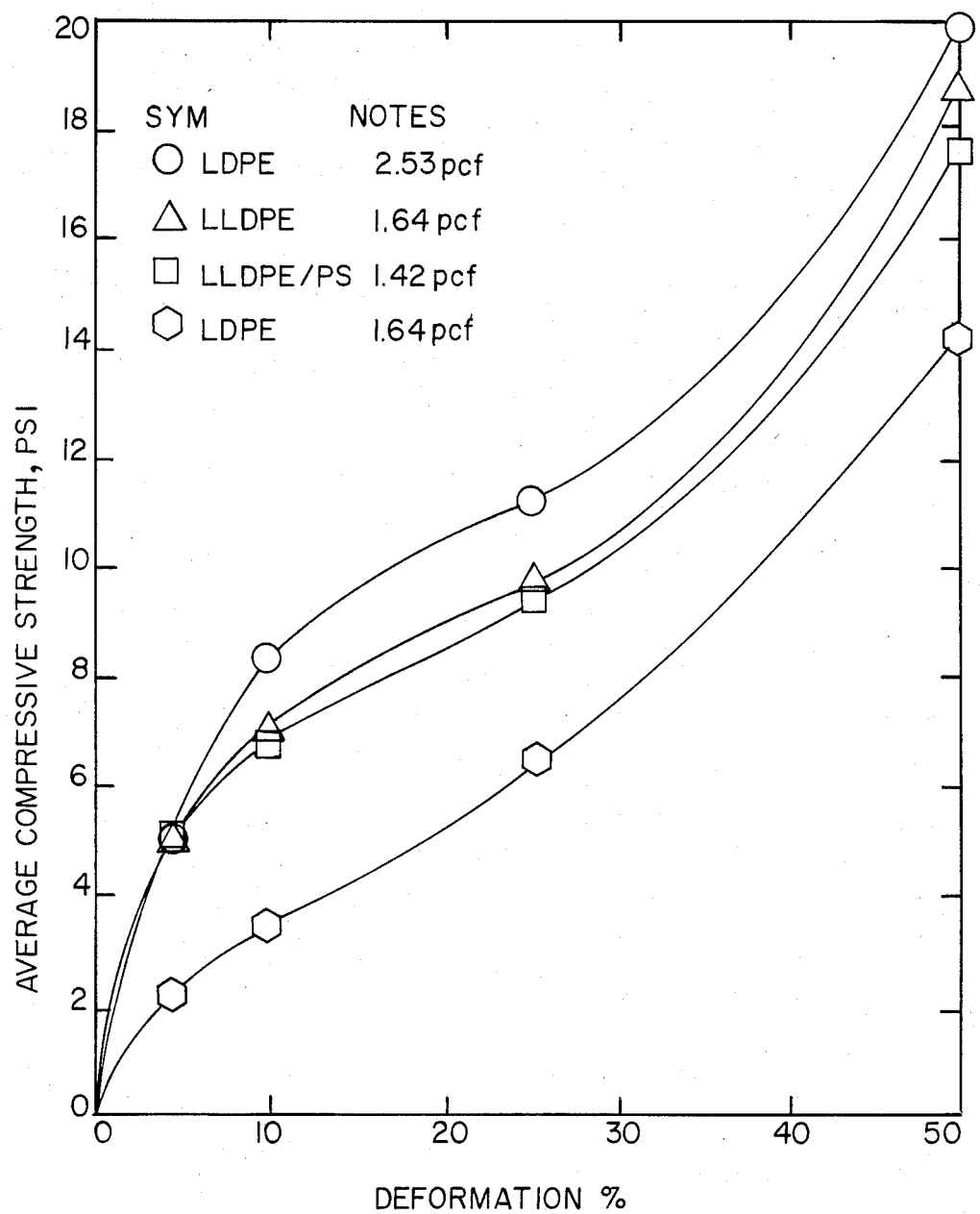
FIG. 6 is a graph of compressive strengths of linear olefinic polymer foams made with a linear low density polyethylene having a melt index of 1.0 and a density of 0.935 gm/cc compared with a low density polyethylene foam (2.3 melt index, 0.923 gm/cc density)
Figure 7:
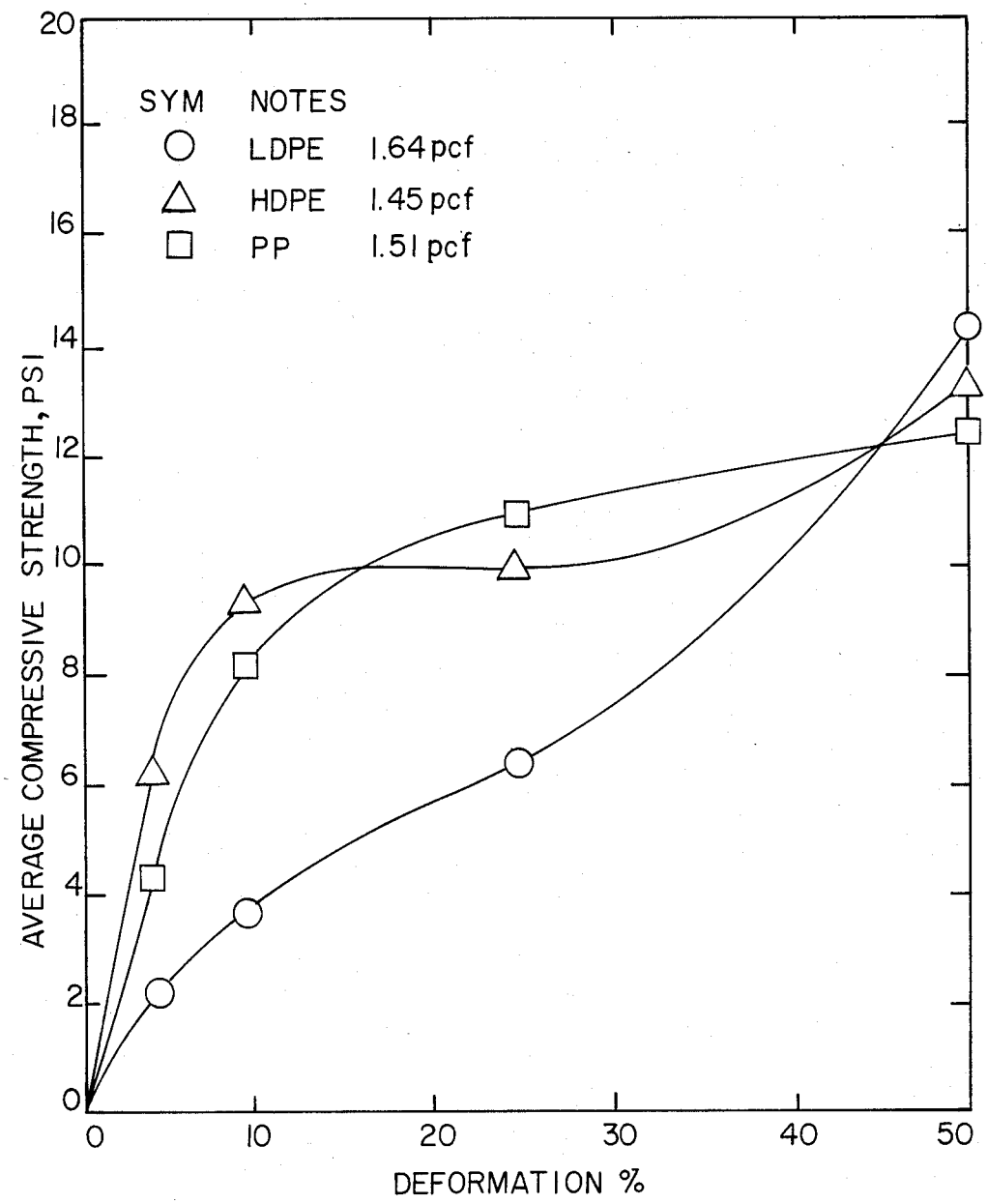
FIG. 7 is a graph of compressive strengths of linear olefinic polymer foams and a low density polyethylene foam.

As shown in FIGS. 6 and 7, and also in Table XVI below, the toughness and strength of the linear polyolefins are also well reflected in their foam properties. A 1.64 pounds per cubic foot (pcf) density LLDPE foam outperforms an equivalent density LDPE foam in all strength categories. The LLDPE foam was twice as strong and twice as tough as the LDPE foam. The 1.64 pcf density LLDPE foam almost matches a much

EXAMPLE XVI

The apparatus used in this example and its operating procedure were the same as used in Example I. A linear low density polyethylene having a 1.0 melt index and 0.935 gm/cc density was used in this example. The polymer granules were mixed with 0.05 pph talc and 0.05 pph organotin catalyst (T-12). A dichlorodifluoromethane (FC-12) blowing agent was added at the rate of 1.82-1.88 lb/hr. As the crosslinking agent, a vinyltrimethoxy silane (VTMO) was injected into the blowing agent stream in the amounts indicated in Table XVI. The extruder zones were maintained at 160°, 180°, and 200° C. for feeding, melting and metering, and mixing, respectively. The gel temperature was fixed at 125° C. for all tests. The test results are set forth in Table XVI.

As can be seen, the control sample with no crosslinking agent collapsed at larger die openings. Only at the smallest die opening was a satisfactory foam produced; however, this foam had a very small cross-section and some open cells. The addition of VTMO as the crosslinking agent permitted the use of wider die openings resulting in good foams having larger cell and cross-sectional sizes while exhibiting a very low open cell content.

TABLE XVI

| Test No. | BA Level (1) | VTMO Level (2) | Gel Temp. (3) | Die Gap (4) | Die Press. (5) | Extruder Press. (6) | Foam Thick. (7) | Foam Width (8) | Foam Density (9) | Cell Size (10) | Open Cell (11) | Foam Appear. (12) |
|---|---|---|---|---|---|---|---|---|---|---|---|---|
| 1 | 18.8 | — | 125 | 0.090 | 330 | 1290 | 0.43 | 0.95 | 3.34 | 0.68 | 81.4 | C |
|   |      |   |     | 0.080 | 350 | 1305 | 0.38 | 0.95 | 2.90 | 0.42 | 76.2 | C |
|   |      |   |     | 0.070 | 380 | 1340 | 0.40 | 0.99 | 2.01 | 0.49 | 63.5 | PC |
|   |      |   |     | 0.065 | 400 | 1370 | 0.40 | 1.00 | 1.79 | 0.45 | 28.7 | B |
|   |      |   |     | 0.060 | 455 | 1460 | 0.42 | 1.05 | 1.76 | 0.41 | 24.6 | V |
|   |      |   |     | 0.055 | 510 | 1490 | 0.40 | 1.06 | 1.72 | 0.41 | 12.6 | E |
| 2 | 18.2 | 0.1 | 125 | 0.090 | 380 | 1360 | 0.60 | 1.05 | 1.96 | 0.58 | 44.8 | B |
|   |      |   |     | 0.080 | 400 | 1390 | 0.61 | 1.08 | 1.71 | 0.52 | 28.1 | V |
|   |      |   |     | 0.070 | 440 | 1440 | 0.59 | 1.17 | 1.67 | 0.59 | 11.8 | G |
|   |      |   |     | 0.065 | 480 | 1480 | 0.56 | 1.18 | 1.63 | 0.48 | 5.2 | E |
| 3 | 18.4 | 0.2 | 125 | 0.090 | 400 | 1390 | 0.65 | 1.07 | 1.72 | 0.49 | 18.1 | V |
|   |      |   |     | 0.080 | 410 | 1410 | 0.61 | 1.12 | 1.84 | 0.52 | 15.5 | G |
|   |      |   |     | 0.070 | 450 | 1460 | 0.58 | 1.17 | 1.67 | 0.48 | 11.5 | G |
|   |      |   |     | 0.065 | 470 | 1490 | 0.53 | 1.17 | 1.73 | 0.52 | 5.8 | E |
| 4 | 18.5 | 0.5 | 125 | 0.090 | 400 | 1400 | 0.66 | 1.05 | 1.79 | 0.51 | 21.7 | V |
|   |      |   |     | 0.080 | 420 | 1410 | 0.62 | 1.12 | 1.85 | 0.44 | 11.8 | G |
|   |      |   |     | 0.070 | 450 | 1460 | 0.58 | 1.17 | 1.64 | 0.37 | 8.4 | G |
|   |      |   |     | 0.065 | 480 | 1470 | 0.56 | 1.18 | 1.69 | 0.46 | 6.4 | E |

(1) = parts of dichlorodifluoromethane mixed in per hundred parts of polymer
(2) = parts of vinyl trimethoxysilane mixed in per hundred parts of polymer
(3) = temperature in degrees centigrade to which the gel was cooled down prior to foam expansion
(4) = gap of die opening in inches at which samples were taken
(5), (6) = pressure in pounds per square inch at the die and at the extruder discharge, respectively
(7), (8) = thickness and width of foam body in inches measured within about five minutes after extrusion
(9) = density of foam body in pounds per cubic foot measured in about one month
(10) = open cell content in percent determined per ASTM D-2856-A
(11) = cell size in millimeter in horizontal direction determined per ASTM D-3576
(12) = subjective judgment of foam appearance; C = total collapse, PC = partial collapse, O = open cells, B = blips or large voids contained in the foam, V = voids of smaller dimensions contained in the foam, H = hairy skin originating from prefoaming, G = good, E = excellent.

EXAMPLE XVII

The apparatus, procedure, polymer, additives, and blowing agent used in this example were the same as used in Example XVI. As the crosslinking agent, a 30:1 by weight mixture of vinyltrimethoxy silane and dicumyl peroxide was injected into the blowing agent stream in the amounts indicated in Table XVII.

As can be seen, the VTMO/peroxide mixture was quite effective and produced excellent quality foams having large cell and cross-sectional sizes and very low open cell content.

TABLE XVII

| Test No. | BA Level (1) | VTMO/ Peroxide Level (2) | Gel Temp. (3) | Die Gap (4) | Die Press. (5) | Extruder Press. (6) | Foam Thick. (7) | Foam Width (8) | Foam Density (9) | Cell Size (10) | Open Cell (11) | Foam Appear. (12) |
|---|---|---|---|---|---|---|---|---|---|---|---|---|
| 1 | 18.8 | 0.1 | 125 | 0.130 | 330 | 1410 | 0.80 | 1.15 | 1.80 | 0.60 | 70.9 | B |
|   |      |   |     | 0.120 | 340 | 1420 | 0.78 | 1.10 | 2.05 | 0.70 | 67.1 | B |
|   |      |   |     | 0.110 | 345 | 1440 | 0.65 | 1.15 | 1.92 | 0.65 | 63.5 | V |
|   |      |   |     | 0.100 | 370 | 1460 | 0.71 | 1.20 | 1.76 | 0.58 | 42.8 | V |
|   |      |   |     | 0.090 | 390 | 1500 | 0.68 | 1.17 | 1.77 | 0.39 | 30.0 | G |
|   |      |   |     | 0.080 | 430 | 1540 | 0.65 | 1.18 | 1.72 | 0.40 | 17.7 | G |
|   |      |   |     | 0.070 | 485 | 1600 | 0.56 | 1.20 | 1.64 | 0.45 | 2.9 | E |
| 2 | 18.8 | 0.2 | 125 | 0.150 | 440 | 1700 | 1.00 | 1.25 | 1.76 | 0.65 | 6.3 | V |
|   |      |   |     | 0.140 | 455 | 1650 | 1.13 | 1.21 | 1.74 | 0.56 | 5.3 | V |
|   |      |   |     | 0.130 | 470 | 1730 | 0.95 | 1.21 | 1.74 | 0.70 | 4.2 | V |
|   |      |   |     | 0.120 | 490 | 1750 | 0.88 | 1.22 | 1.73 | 0.60 | 1.6 | G |
|   |      |   |     | 0.110 | 510 | 1760 | 0.88 | 1.22 | 1.61 | 0.81 | 3.2 | G |
|   |      |   |     | 0.100 | 520 | 1800 | 0.80 | 1.22 | 1.67 | 0.52 | 4.2 | G |
|   |      |   |     | 0.090 | 550 | 1870 | 0.73 | 1.28 | 1.61 | 0.52 | 4.1 | E |

(1) = parts of dichlorodifluoromethane mixed in per hundred parts of polymer
(2) = parts of 30/1 by weight mixture of vinyltrimethoxy silane and dicumyl peroxide mixed in per hundred parts of polymer
(3) = temperature in degrees centigrade to which the gel was cooled down prior to foam expansion
(4) = gap of die opening in inches at which samples were taken
(5), (6) = pressure in pounds per square inch at the die and at the extruder discharge, respectively
(7), (8) = thickness and width of foam body in inches measured within about five minutes after extrusion
(9) = density of foam body in pounds per cubic foot measured in about one month
(10) = open cell content in percent determined per ASTM D-2856-A
(11) = cell size in millimeter in horizontal direction determined per ASTM D-3576
(12) = subjective judgment of foam appearance; C = total collapse, PC = partial collapse, O = open cells, B = blips or large voids contained in the foam, V = voids of smaller dimensions contained in the foam, H = hairy skin originating from prefoaming, G = good, E = excellent.

While the methods and compositions herein described constitute preferred embodiments of the invention, it is to be understood that the invention is not limited to these precise method and compositions, and that changes may be made in either without departing from the scope of the invention, which is defined in the appended claims.

What is claimed is:

1. A process for preparing a lightly crosslinked linear olefin polymer foam material having a substantially closed-cell structure, comprising the steps of:
   (a) melt processing under pressure a linear olefin polymer or blend of linear olefin polymers,
   (b) mixing a volatile blowing agent and a sufficient amount of one crosslinking agent selected from the group consisting of azido functional silanes. multifunctional vinyl monomers, and oxygen, together with said linear olefin polymer or blend of linear olefin polymers to form a flowable admixture, and, (c) extruding said admixture through a die to a zone of lower pressure and activating said blowing agent to expand said linear olefin polymer or blend of linear olefin polymers to a closed-cell structure crosslinked with itself to form said lightly crosslinked foam material.

2. The process of claim 1 in which said linear olefin polymer is linear low density polyethylene.

3. The process of claim 1 in which said linear olefin polymer is high density polyethylene.

4. The process of claim 1 in which said linear olefin polymer is polypropylene.

5. The process of claim 1 in which said linear olefin polymer is polystyrene.

6. The process of claim 1 in which the pressure at said die is at least 400 psig.

7. The process of claim 1 in which said crosslinking agent is 2-(trimethoxysilyl ethyl phenyl sulfonyl) azide, and a catalyst which catalyzes the condensation of silanols is added with the crosslinking agent.

8. The process of claim 1 in which said crosslinking agent is trimethylolpropane triacrylate.

9. A process for preparing a lightly crosslinked linear olefin polymer foam material having a substantially closed-cell structure, comprising the steps of:

(a) melt process under pressure a linear olefin polymer or blend of linear olefin polymers together with a volatile blowing agent to form a flowable admixture, (b) introducing an amount of crosslinking agent sufficient to initiate crosslinking of said linear olefin polymer or blend and increase the pressure of said admixture to at least 400 psig, said crosslinking agent consisting of one of azido functional silanes, multifunctional vinyl monomers, or oxygen, and (c) extruding said admixture through a die to a zone of lower pressure and activating said blowing agent to expand said linear olefin polymer or blend to a substantially closed-cell structure crosslinked with itself to form said lightly crosslinked foam material.

10. The process of claim 9 in which said crosslinking agent is from 0.01 to 2.0 pph of an azido functional silane, and a catalyst which catalyzes the condensation of silanols is added.

11. The process of claim 9 in which said crosslinking agent is from 0.01 to 2.0 pph of a multifunctional vinyl monomer.

12. A process for preparing a lightly crosslinked linear olefin polymer foam material having a substantially closed-cell structure comprising the steps of:

(a) melt processing under pressure a linear olefin polymer or blend of linear olefin polymers, (b) mixing a volatile blowing agent and a sufficient amount of a crosslinking agent selected from the group consisting of azido functional silanes, multifunctional vinyl monomers, oxygen, and mixtures thereof, together with said linear olefin polymer or blend of linear olefin polymers to form a flowable admixture, and, (c) extruding said admixtures through a die to a zone of lower pressure and activating said blowing agent to expand said linear olefin polymer or blend of linear olefin polymers to a substantially closed-cell structure crosslinked with itself to form said lightly crosslinked foam material.

* * * * *

UNITED STATES PATENT AND TRADEMARK OFFICE
CERTIFICATE OF CORRECTION

PATENT NO. : 4,714,716

DATED : December 22, 1987

INVENTOR(S) : Chung P. Park

It is certified that error appears in the above-identified patent and that said Letters Patent is hereby corrected as shown below:

Column 1, line 45, "tne" should correctly appear as --the--.

Column 1, line 47, "witn" should correctly appear as --with--.

Column 3, line 62, "aoout" should correctly appear as --about--.

Cloumn 6, line 63, "witn" should correctly appear as --with--.

Column 7, line 59, "0.145'" should correctly appear as --0.145"--.

Column 17, line 65, following the word "was" insert therefore --fed--.

Column 17, line 66, following the word "rate" insert therefore --of--.

Column 17, line 66 "bout" should correctly appear as --about--.

Column 17, line 67, following the "agent" insert therefore --was--.

UNITED STATES PATENT AND TRADEMARK OFFICE
CERTIFICATE OF CORRECTION

PATENT NO. : 4,714,716
DATED : December 22, 1987
INVENTOR(S) : Chung P. Park

It is certified that error appears in the above-identified patent and that said Letters Patent is hereby corrected as shown below:

Column 31, line 1, "silanes." should correctly appear as --silanes,--.

Column 31, line 30, "process" should correctly appear as --processing--.

Column 32, line 29, "admixtures" should correctly appear as --admixture--.

Signed and Sealed this

Nineteenth Day of June, 1990

Attest:

HARRY F. MANBECK, JR.

*Attesting Officer*  *Commissioner of Patents and Trademarks*